United States Patent
Tholome et al.

(10) Patent No.: US 8,935,247 B1
(45) Date of Patent: Jan. 13, 2015

(54) METHODS AND SYSTEMS FOR HIERARCHICALLY PARTITIONING A DATA SET INCLUDING A PLURALITY OF OFFERINGS

(71) Applicant: Google Inc., Mountain View, CA (US)

(72) Inventors: Eric Tholome, Zug Zug (CH); Matthias Zenger, Zürich (CH); Lars Fabian Krüger, Zürich (CH); Vinsensius Berlian Vega Satriardhi Naryanto, Zürich (CH); Burak Emir, Zürich (CH); Florin Oswald, Zürich (CH); Kate Emma Whelan, Zürich (CH); Robert Moritz Buessow, Zürich (CH); Thomas Kotzmann, Zürich (CH); Salih Burak Gokturk, Palo Alto, CA (US); Istvan Hernadvolgyi, Adliswil (CH)

(73) Assignee: Googel Inc., Mountain View, CA (US)

( * ) Notice: Subject to any disclaimer, the term of this patent is extended or adjusted under 35 U.S.C. 154(b) by 0 days.

(21) Appl. No.: 14/106,395

(22) Filed: Dec. 13, 2013

Related U.S. Application Data

(60) Provisional application No. 61/893,413, filed on Oct. 21, 2013.

(51) Int. Cl.
*G06F 17/30* (2006.01)

(52) U.S. Cl.
CPC ................ *G06F 17/30289* (2013.01)
USPC ............... 707/736; 707/737; 706/16; 706/17; 706/18

(58) Field of Classification Search
CPC .......... G06F 17/30867; G06F 17/3053; G06F 17/30663; G06F 17/30386; G06F 17/30646
See application file for complete search history.

(56) References Cited

U.S. PATENT DOCUMENTS

| | | | |
|---|---|---|---|
| 6,910,044 B2 | 6/2005 | Weinberg et al. | |
| 7,231,358 B2 | 6/2007 | Singh et al. | |

(Continued)

OTHER PUBLICATIONS

"4 paid search strategies to advertise your entire product catalog," http://searchengineland.com/4-paid-search-strategies-to-successfully-advertise-your-entire-product-catalog-172424, Sep. 20, 2013, page accessed Oct. 17, 2013.

Dent, A., "Product listing ads: How to maximize your returns," http://searchenginewatch.com/article/2263233/Product-Listing-Ads-How-to-Maximize-Your-Returns, Apr. 23, 2013, page accessed Oct. 17, 2013.

(Continued)

*Primary Examiner* — Angelica Ruiz
(74) *Attorney, Agent, or Firm* — Foley and Lardner LLP; John D. Lanza

(57) ABSTRACT

Systems and methods for hierarchically partitioning a data set including a plurality of offerings are described. A system receives a data set including a plurality of offerings characterized by one or more offering attributes. The system identifies one or more candidate offering attributes associated with the offerings according to which the offerings are to be partitioned. The system assigns a partition hierarchy level to each of the candidate offering attributes that indicates a hierarchy of the offering attribute relative to other candidate offering attributes. The system determines, for each of the candidate offering attributes, a plurality of attribute values according to which the offerings are to be partitioned. The system partitions the plurality of offerings across a plurality of partition groups according to a hierarchical decision tree structure based on the partition hierarchy levels of the candidate offering attributes and the identified attribute values of each of the candidate offering attributes.

15 Claims, 15 Drawing Sheets

(56) References Cited

U.S. PATENT DOCUMENTS

| | | | |
|---|---|---|---|
| 7,870,039 | B1 | 1/2011 | Dom et al. |
| 7,921,052 | B2 * | 4/2011 | Dabney et al. .................. 705/37 |
| 8,190,489 | B2 | 5/2012 | Sandholm et al. |
| 8,204,818 | B1 | 6/2012 | Aggarwal |
| 8,266,003 | B1 | 9/2012 | Mirchandani et al. |
| 8,346,607 | B1 | 1/2013 | Benson et al. |
| 8,433,611 | B2 | 4/2013 | Lax et al. |
| 2006/0041500 | A1 * | 2/2006 | Diana et al. ...................... 705/37 |
| 2006/0069614 | A1 | 3/2006 | Agarwal et al. |
| 2006/0224447 | A1 | 10/2006 | Koningstein |
| 2007/0265923 | A1 | 11/2007 | Krassner et al. |
| 2007/0294149 | A1 * | 12/2007 | Lu et al. .......................... 705/28 |
| 2008/0140489 | A1 | 6/2008 | Berkhin et al. |
| 2009/0006375 | A1 | 1/2009 | Lax et al. |
| 2009/0132353 | A1 | 5/2009 | Maggenti et al. |
| 2010/0094712 | A1 | 4/2010 | Lai |
| 2010/0138291 | A1 | 6/2010 | Silverman et al. |
| 2010/0211460 | A1 | 8/2010 | Agarwal et al. |
| 2010/0223141 | A1 | 9/2010 | Spencer et al. |
| 2011/0015994 | A1 | 1/2011 | Ramer et al. |
| 2011/0035277 | A1 | 2/2011 | Kodialam et al. |
| 2011/0040616 | A1 | 2/2011 | Kannan et al. |
| 2011/0071879 | A1 | 3/2011 | Flockhart et al. |
| 2011/0071900 | A1 | 3/2011 | Kamath et al. |
| 2011/0078000 | A1 | 3/2011 | Ma et al. |
| 2011/0179033 | A1 * | 7/2011 | Mount et al. ................... 707/737 |
| 2011/0231264 | A1 | 9/2011 | Dilling et al. |
| 2011/0231296 | A1 | 9/2011 | Gross et al. |
| 2011/0270673 | A1 | 11/2011 | Lin et al. |
| 2012/0036024 | A1 | 2/2012 | Mysen et al. |
| 2012/0066065 | A1 | 3/2012 | Switzer |
| 2012/0123856 | A1 | 5/2012 | Paunikar et al. |
| 2012/0166452 | A1 | 6/2012 | Tseng |
| 2012/0310729 | A1 | 12/2012 | Dalto et al. |
| 2013/0018722 | A1 | 1/2013 | Libby |
| 2013/0159092 | A1 | 6/2013 | Lahaie et al. |
| 2013/0212108 | A1 | 8/2013 | Armon-Kest et al. |
| 2013/0212608 | A1 | 8/2013 | Cansler et al. |
| 2013/0238762 | A1 * | 9/2013 | Raleigh et al. ................ 709/219 |
| 2013/0339126 | A1 | 12/2013 | Cui et al. |

OTHER PUBLICATIONS

AW4P: Internet Marketing & SEO Blog, printed from Internet address: http://aw4p.blogspot.com/2007/03/little-known-adwords-features-bid.html on Jan. 24, 2013, 5 pages.

Google Help, "Understanding bidding basics." https://support.google.com/adwords/answer/2459326?hl=en.

Google Inc., Target CPA Bidding: A New Way to Meet your ROI Goals with Conversion Optimizer, dated May 3, 2010, printed from Internet address: www.adwords.blogspot.com/2010/05/target-cpa-bidding-new-way-to-meet-your.html on Apr. 12, 2013, 2 pages.

Google Inc., Using Custom Scheduling, printed from Internet address: http://www.support.google.com/adwords/answer/2404244/?hl=en on Jan. 23, 2013, 6 pages.

Google, Inc., About Conversion Optimizer, printed from Internet address: www.support.google.com/adwords/answer/2471188?hl=en on Apr. 12, 2013, 4 pages.

Google, Inc., Enter Experimental Bids in AdWords Editor, printed from Internet address: http://support.google.com/adwords/editor/answer/1399246?hl=en on Jan. 23, 2013, 2 pages.

Google, Inc., Google Plans to Combine Mobile & Desktop Ads—Search Engine Watch (#SEW), printed from Internet address: http://searchenginewatch.com/article/2219061/Google-Plans-to-Combine-Mobile-Desktop . . . on Jan. 24, 2013, 7 pages.

Google, Inc., Why Costs Might Exceed Your Daily Budget, printed from Internet address: http://support.google.com/adwords/answer/2375423?hl=en on Mar. 21, 2013, 3 pages.

Highlights of the SMX Advanced Session on PPPC Enhanced Campaigns—Sep. 11, 2013 http://searchengineland.com/highlights-of-the-smx-advanced-session-on-ppc-enhanced-campaigns.

How to Determine Your Mobile & Geo Bid Multipliers for Enhanced Campaigns: Mar. 22, 2013 by Benjamin Vigneron.

International Search Report and Written Opinion mailed Mar. 26, 2014, in PCT Application No. PCT/US2013/073328 (12 pages).

Marin Software, ROI-Based Campaign Management: Optimization Beyond Bidding, White Paper, Oct. 2009, 16 pages.

Office Action on U.S. Appl. No. 14/049,889 dated Mar. 12, 2014.

Office Action on U.S. Appl. No. 14/055,523 dated Feb. 10, 2014.

* cited by examiner

| Auction Log 500 | | | | | | | |
|---|---|---|---|---|---|---|---|
| Auction ID 502 | Catalog ID 510 | Product ID 512 | Bid Values 514a-n | Winning Bid Values 516a-n | Winning Bid Position 518 | Participant ID 520a-n | Bid Difference 522a-n |
| Keyword 508a-n | | | | | | | |

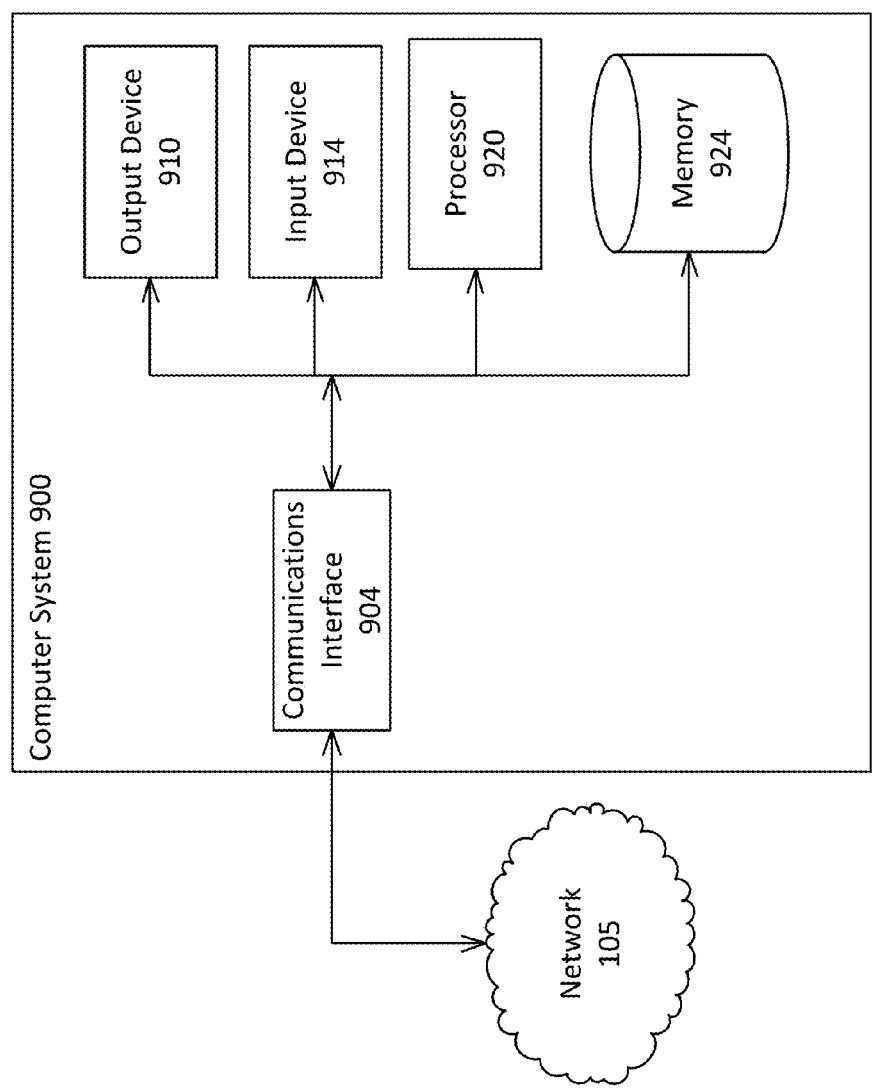

METHODS AND SYSTEMS FOR HIERARCHICALLY PARTITIONING A DATA SET INCLUDING A PLURALITY OF OFFERINGS

RELATED APPLICATIONS

This application claims priority to U.S. Provisional Patent Application No. 61/893,413, entitled "Methods and systems for hierarchically partitioning a data set including a plurality of offerings" and filed Oct. 21, 2013, which is incorporated by reference herein in its entirety.

BACKGROUND

Existing third-party content placement campaign management platforms have been unable to successfully address the needs of retail-based advertisers. This is mainly because the existing third-party content placement campaign management platforms have focused on providing text-based advertisements in response to search queries. There are some third-party content placement campaign management platforms that provide tools for product listing ads, which are search ads that include richer product information, such as product image, price and merchant name, without requiring additional keywords or ad text.

SUMMARY

At least one aspect is directed to a computer implemented method for hierarchically partitioning a data set including a plurality of offerings. A data processing system receives a data set including a plurality of offerings. Each of the offerings is characterized by one or more offering attributes. The data processing system identifies one or more candidate offering attributes associated with the offerings according to which the offerings are to be partitioned. The data processing system then assigns a partition hierarchy level to each of the candidate offering attributes. The partition hierarchy level of a candidate offering attribute indicates a hierarchy of the offering attribute relative to other candidate offering attributes. The data processing system determines, for each of the candidate offering attributes, a plurality of attribute values according to which the offerings are to be partitioned. The data processing system then partitions the plurality of offerings across a plurality of partition groups according to a hierarchical decision tree structure based on the partition hierarchy levels of the candidate offering attributes and the identified attribute values of each of the candidate offering attributes. Each of the partition groups can correspond to a respective identified attribute value.

In some implementations, receiving a data set including a plurality of offerings includes receiving one or more candidate offering attributes and partition hierarchy levels for the candidate offering attributes. In some implementations, to determine, for each of the candidate offering attributes, a plurality of attribute values according to which the offerings are to be partitioned includes identifying one or more performance metrics goals associated with the offerings and determining, based on the performance metric goals, a plurality of attribute values according to which the offerings are to be partitioned.

In some implementations, for the data processing system to determine, for each of the candidate offering attributes, a plurality of attribute values according to which the offerings are to be partitioned, the data processing system can identify, from the data set, each of the attribute values for a candidate offering attribute. The data processing system can also determine, for each of the identified attribute values, a number of offerings corresponding to the identified attribute value and select one or more attribute values having a number of offerings that exceed a threshold number of offerings for partitioning the plurality of offerings.

In some implementations, at least one of the plurality of attribute values according to which the offerings are to be partitioned corresponds to a discrete attribute value associated with a particular attribute. In some implementations, at least one of the plurality of attribute values according to which the offerings are to be partitioned corresponds to a range of attribute values associated with a particular attribute.

In some implementations, to determine, for each of the candidate offering attributes, a plurality of attribute values according to which the offerings are to be partitioned, the data processing system can identify bid history associated with the offerings, determine, from the bid history, one or more bid value ranges and group attribute values corresponding to a bid value range of the bid value ranges. The bid value ranges can include one or more average bid values associated with the attribute values.

In some implementations, to partition the plurality of offerings across a plurality of partition groups, the data processing system can partition the plurality of offerings across a first set of partition groups corresponding to attribute values of the candidate offering attribute assigned a highest partition hierarchy level. The data processing system can then further partition the plurality of offerings in one or more of the partition groups across a second set of partition groups corresponding to attribute values of one or more candidate offering attributes assigned a second highest partition hierarchy level.

In some implementations, the data processing system can, for one or more candidate offering attribute for which the attribute values do not encompass each of the possible attribute values associated with the candidate offering attribute, creating a partition group configured to include those offerings having attribute values that do not correspond to the one or more determined attribute values.

In some implementations, to partition the plurality of offerings across a plurality of partition groups, the data processing system identifies the attribute values associated with each of the candidate offering attributes and matches, for each offering, an attribute value to one of the identified attribute values. The data processing system then includes, for each offering, the offering in a partition group corresponding to the attribute value with which the attribute value of the offering matched. In some implementations, each offering is exclusively included in only one partition group per candidate offering attribute.

At least one aspect is directed to a computer implemented system for hierarchically partitioning a data set including a plurality of offerings. The system includes a data processing system that has a partition hierarchy module. The data processing system can include a memory storing processor-executable instructions and a processor configured to execute the processor executable instructions. In some implementations, the processor receives a data set including a plurality of offerings. Each of the offerings is characterized by one or more offering attributes. The processor identifies one or more candidate offering attributes associated with the offerings according to which the offerings are to be partitioned. The processor then assigns a partition hierarchy level to each of the candidate offering attributes. The partition hierarchy level of a candidate offering attribute indicates a hierarchy of the offering attribute relative to other candidate offering attributes. The processor determines, for each of the candidate offering attributes, a plurality of attribute values according to which the offerings are to be partitioned. The processor then partitions the plurality of offerings across a plurality of partition groups according to a hierarchical decision tree structure based on the partition hierarchy levels of the candidate offering attributes and the identified attribute values of each of the candidate offering attributes. Each of the partition groups can correspond to a respective identified attribute value.

In some implementations, receiving a data set including a plurality of offerings includes receiving one or more candidate offering attributes and partition hierarchy levels for the candidate offering attributes. In some implementations, to determine, for each of the candidate offering attributes, a plurality of attribute values according to which the offerings are to be partitioned includes identifying one or more performance metrics goals associated with the offerings and determining, based on the performance metric goals, a plurality of attribute values according to which the offerings are to be partitioned.

In some implementations, to determine, for each of the candidate offering attributes, a plurality of attribute values according to which the offerings are to be partitioned, the processor can identify, from the data set, each of the attribute values for a candidate offering attribute. The processor can also determine, for each of the identified attribute values, a number of offerings corresponding to the identified attribute value and select one or more attribute values having a number of offerings that exceed a threshold number of offerings for partitioning the plurality of offerings.

In some implementations, at least one of the plurality of attribute values according to which the offerings are to be partitioned corresponds to a discrete attribute value associated with a particular attribute. In some implementations, at least one of the plurality of attribute values according to which the offerings are to be partitioned corresponds to a range of attribute values associated with a particular attribute.

In some implementations, to determine, for each of the candidate offering attributes, a plurality of attribute values according to which the offerings are to be partitioned, the processor can identify bid history associated with the offerings, determine, from the bid history, one or more bid value ranges and group attribute values corresponding to a bid value range of the bid value ranges. The bid value ranges can include one or more average bid values associated with the attribute values.

In some implementations, to partition the plurality of offerings across a plurality of partition groups, the processor can partition the plurality of offerings across a first set of partition groups corresponding to attribute values of the candidate offering attribute assigned a highest partition hierarchy level. The processor can then further partition the plurality of offerings in one or more of the partition groups across a second set of partition groups corresponding to attribute values of one or more candidate offering attributes assigned a second highest partition hierarchy level.

In some implementations, the processor can, for one or more candidate offering attribute for which the attribute values do not encompass each of the possible attribute values associated with the candidate offering attribute, creating a partition group configured to include those offerings having attribute values that do not correspond to the one or more determined attribute values.

In some implementations, to partition the plurality of offerings across a plurality of partition groups, the processor identifies the attribute values associated with each of the candidate offering attributes and matches, for each offering, an attribute value to one of the identified attribute values. The processor then includes, for each offering, the offering in a partition group corresponding to the attribute value with which the attribute value of the offering matched. In some such implementations, each offering is exclusively included in only one partition group per candidate offering attribute.

According to another aspect, a computer readable storage medium having instructions to provide information via a computer network. The instructions include instructions to receive a data set including a plurality of offerings. Each of the offerings is characterized by one or more offering attributes. The instructions also include instructions to identify one or more candidate offering attributes associated with the offerings according to which the offerings are to be partitioned The instructions also include instructions to assign a partition hierarchy level to each of the candidate offering attributes. The partition hierarchy level of a candidate offering attribute indicates a hierarchy of the offering attribute relative to other candidate offering attributes. The instructions also include instructions to determine, for each of the candidate offering attributes, a plurality of attribute values according to which the offerings are to be partitioned. The instructions also include instructions to partition the plurality of offerings across a plurality of partition groups according to a hierarchical decision tree structure based on the partition hierarchy levels of the candidate offering attributes and the identified attribute values of each of the candidate offering attributes. Each of the partition groups can correspond to a respective identified attribute value.

In some implementations, receiving a data set including a plurality of offerings includes receiving one or more candidate offering attributes and partition hierarchy levels for the candidate offering attributes. In some implementations, to determine, for each of the candidate offering attributes, a plurality of attribute values according to which the offerings are to be partitioned includes identifying one or more performance metrics goals associated with the offerings and determining, based on the performance metric goals, a plurality of attribute values according to which the offerings are to be partitioned.

In some implementations, for the data processing system to determine, for each of the candidate offering attributes, a plurality of attribute values according to which the offerings are to be partitioned, the data processing system can identify, from the data set, each of the attribute values for a candidate offering attribute. The data processing system can also determine, for each of the identified attribute values, a number of offerings corresponding to the identified attribute value and select one or more attribute values having a number of offerings that exceed a threshold number of offerings for partitioning the plurality of offerings.

In some implementations, at least one of the plurality of attribute values according to which the offerings are to be partitioned corresponds to a discrete attribute value associated with a particular attribute. In some implementations, at least one of the plurality of attribute values according to which the offerings are to be partitioned corresponds to a range of attribute values associated with a particular attribute.

At least one aspect is directed to a computer implemented method for providing a bid recommendation for a partition group including one or more offerings of a data set. A data processing system identifies, for a partition group for which a bid recommendation is to be provided, one or more offerings included in the partition group. The partition group can be associated with a content placement campaign that includes a plurality of offerings hierarchically partitioned into a plurality of partition groups. The data processing system then identifies auction related data associated with auctions in which the offerings in the partition group participated or would likely have participated. The data processing system determines, from the auction related data, for each offering, an average bid value to achieve a performance metric goal of the partition group. The data processing system then computes, from the determined average bid values for each of the offerings, a bid recommendation for the partition group and provides the computed bid recommendation for the partition group for display.

In some implementations, the data processing system is further configured to identify, for each offering, a universal identifier corresponding to the offering identify auctions associated with the universal identifier over a predetermined time period based on the universal identifier corresponding to the offering. The data processing system can then select one or more of the identified auctions according to a filtering criteria that corresponds to a bidding policy associated with the offering in the partition group.

In some implementations, to determine an average bid value to achieve a performance metric goal of the partition group, the data processing system can determine a minimum winning bid amount required to win the auction for each identified auction associated with the identified auction related data.

In some implementations, the performance metric goals of a campaign includes one or more of a predetermined impression share for offerings included in the partition group, a predetermined click-through rate for offerings included in the partition group, and a predetermined impression share of the offerings included in the partition at one or more content placement positions.

In some implementations, to identify auction related data associated with auctions in which the offerings in the partition group participated or would likely have participated, the data processing system can identify auction related data associated with auctions in which offerings matching the offerings in the partition group participated.

In some implementations, the auction related data of auctions in which offerings included in the partition group participated or would likely have participated includes one or more of a winning price of each of the auctions and an identity of the winning bidder of each of the auctions, identities of competitors competing in the auctions.

In some implementations, to determine, for each offering, an average bid value to achieve a performance metric goal of the offering, the data processing system is configured to identify one or more winning bid values corresponding to bid values placed for offerings that won the auction from auctions in which the offering participated or would likely have participated and determine an average bid value to achieve a performance metric goal of the offering from the identified winning bid values.

In some implementations, to compute, from the determined average bid values for each of the offerings, a bid recommendation for the partition group, the data processing system is configured to determine, for each offering, a number of auctions in which the offering participated or would likely have participated over a predetermined time period. The data processing system can then assign a weight to each of the average bid values for each of the offerings based on the determined number of auctions in which the offering participated or would likely have participated. The data processing system can then compute the bid recommendation for the partition group based on the determined average bid values for each of the offerings and the weight assigned to each of the average bid values for each of the offerings.

In some implementations, the plurality of offerings are partitioned across a plurality of partition groups according to a hierarchical decision tree structure based on partition hierarchy levels of one or more candidate entity attributes and corresponding attribute values of each of the candidate entity attributes. In some implementations, the performance metric goal of the partition group is determined from the identified performance metric goals of the campaign.

At least one aspect is directed to a computer implemented system for providing a bid recommendation for a partition group including one or more offerings of a data set. The system includes a data processing system that has a bid recommendation module. The data processing system can include a memory storing processor-executable instructions and a processor configured to execute the processor executable instructions. In some implementations, the processor identifies, for a partition group for which a bid recommendation is to be provided, one or more offerings included in the partition group. The partition group can be associated with a content placement campaign that includes a plurality of offerings hierarchically partitioned into a plurality of partition groups. The processor then identifies auction related data associated with auctions in which the offerings in the partition group participated or would likely have participated. The processor determines, from the auction related data, for each offering, an average bid value to achieve a performance metric goal of the partition group. The processor then computes, from the determined average bid values for each of the offerings, a bid recommendation for the partition group and provides the computed bid recommendation for the partition group for display.

In some implementations, the processor is further configured to identify, for each offering, a universal identifier corresponding to the offering identify auctions associated with the universal identifier over a predetermined time period based on the universal identifier corresponding to the offering. The processor can then select one or more of the identified auctions according to a filtering criteria that corresponds to a bidding policy associated with the offering in the partition group.

In some implementations, to determine an average bid value to achieve a performance metric goal of the partition group, the processor can determine a minimum winning bid amount required to win the auction for each identified auction associated with the identified auction related data.

In some implementations, the performance metric goals of a campaign includes one or more of a predetermined impression share for offerings included in the partition group, a predetermined click-through rate for offerings included in the partition group, and a predetermined impression share of the offerings included in the partition at one or more content placement positions.

In some implementations, to identify auction related data associated with auctions in which the offerings in the partition group participated or would likely have participated, the processor can identify auction related data associated with auctions in which offerings matching the offerings in the partition group participated.

In some implementations, the auction related data of auctions in which offerings included in the partition group participated or would likely have participated includes one or more of a winning price of each of the auctions and an identity of the winning bidder of each of the auctions, identities of competitors competing in the auctions.

In some implementations, to determine, for each offering, an average bid value to achieve a performance metric goal of the offering, the processor is configured to identify one or more winning bid values corresponding to bid values placed for offerings that won the auction from auctions in which the offering participated or would likely have participated and determine an average bid value to achieve a performance metric goal of the offering from the identified winning bid values.

In some implementations, to compute, from the determined average bid values for each of the offerings, a bid recommendation for the partition group, the processor is configured to determine, for each offering, a number of auctions in which the offering participated or would likely have participated over a predetermined time period. The processor can then assign a weight to each of the average bid values for each of the offerings based on the determined number of auctions in which the offering participated or would likely have participated. The processor can then compute the bid recommendation for the partition group based on the determined average bid values for each of the offerings and the weight assigned to each of the average bid values for each of the offerings.

In some implementations, the plurality of offerings are partitioned across a plurality of partition groups according to a hierarchical decision tree structure based on partition hierarchy levels of one or more candidate entity attributes and corresponding attribute values of each of the candidate entity attributes. In some implementations, the performance metric goal of the partition group is determined from the identified performance metric goals of the campaign.

According to another aspect, a computer readable storage medium having instructions to provide information via a computer network. The instructions include instructions to identify, for a partition group for which a bid recommendation is to be provided, one or more offerings included in the partition group. The partition group can be associated with a content placement campaign that includes a plurality of offerings hierarchically partitioned into a plurality of partition groups. The instructions include instructions to identify auction related data associated with auctions in which the offerings in the partition group participated or would likely have participated. The data processing system determines, from the auction related data, for each offering, an average bid value to achieve a performance metric goal of the partition group. The instructions include instructions to compute, from the determined average bid values for each of the offerings, a bid recommendation for the partition group and provide the computed bid recommendation for the partition group for display.

In some implementations, the instructions can further include instructions to identify, for each offering, a universal identifier corresponding to the offering identify auctions associated with the universal identifier over a predetermined time period based on the universal identifier corresponding to the offering. The instructions further include instructions to select one or more of the identified auctions according to a filtering criteria that corresponds to a bidding policy associated with the offering in the partition group.

In some implementations, to determine an average bid value to achieve a performance metric goal of the partition group, the instructions include instructions to determine a minimum winning bid amount required to win the auction for each identified auction associated with the identified auction related data.

In some implementations, the performance metric goals of a campaign includes one or more of a predetermined impression share for offerings included in the partition group, a predetermined click-through rate for offerings included in the partition group, and a predetermined impression share of the offerings included in the partition at one or more content placement positions.

At least one aspect is directed to a computer implemented method for providing a modified bid in an auction. A data processing system identifies a content placement campaign including a plurality of partition groups including one or more offerings characterized by one or more offering attributes. Each of the partition groups can correspond to an attribute value of an offering attribute and have an associated bid value. The data processing system can identify an attribute value of a candidate offering attribute for which to establish a modified bid and establish, for the identified attribute value of the candidate offering attribute, a modified bid corresponding to one or more offerings that match the identified attribute value of the candidate offering attribute. The data processing system can then provide the modified bid in an auction in which one of the offerings that match the identified attribute value of the candidate offering attribute is participating.

In some implementations, the data processing system can identify an attribute value of a candidate offering attribute for which to establish a modified bid by identifying a plurality of offerings for which to provide a modified bid and determining an attribute value of a candidate offering attribute common to the plurality of offerings. In some implementations, the data processing system can identify an attribute value of a candidate offering attribute for which to establish a modified bid by identifying a particular offering for which to provide a modified bid and determining an attribute value of a candidate offering attribute unique to the particular offering.

In some implementations, the data processing system is further configured to analyze performance metrics associated with a plurality of offerings included in the content placement campaign, identify one or more of the plurality of offerings having performance metrics statistics below a predetermined threshold and determine, from the performance metrics statistics, a modified bid to establish for the one or more offerings identified as having performance metrics statistics below the predetermined threshold.

In some implementations, the data processing system is further configured to receive a modified bid from an entity managing the content placement campaign. In some implementations, the modified bid corresponds to a bid modifier configured to modify a base bid value associated with a partition group of the content placement campaign.

In some implementations, to establish a modified bid, the data processing system can establish a secondary content placement campaign in which offerings associated with the identified attribute value of the candidate offering attribute are included in a single partition group and assign the modified bid to the single partition group. In some implementations, the data processing system can assign the secondary content placement campaign a campaign priority level higher than a campaign priority level of the content placement campaign. In some implementations, to establish modified bids, the data processing system can establish a secondary content placement campaign in which offerings associated with the identified attribute value of the candidate offering attribute are included in one or more partition groups and assign the modified bids to the partition groups.

In some implementations, the data processing system is further configured to monitor auction related data of auctions in which the offerings participated. The data processing system can identify, for one or more offering attributes, trends relating to the performance of the offerings. The data processing system can then determine, from the identified trends, a potential opportunity to modify the performance of the offerings for which the trend was identified.

In some implementations, the data processing system is further configured to identify a bid modification policy for applying the modified bid, identify that a condition of the bid modification policy has been met and select the modified bid to provide in an auction in which one of the offerings that match the identified attribute value of the candidate offering attribute is participating.

At least one aspect is directed to a computer implemented system for providing a modified bid in an auction. The system includes a data processing system that has a bid modification module. The data processing system can include a memory storing processor-executable instructions and a processor configured to execute the processor executable instructions. In some implementations, the processor can identify a content placement campaign including a plurality of partition groups including one or more offerings characterized by one or more offering attributes. Each of the partition groups can correspond to an attribute value of an offering attribute and have an associated bid value. The processor can identify an attribute value of a candidate offering attribute for which to establish a modified bid and establish, for the identified attribute value of the candidate offering attribute, a modified bid corresponding to one or more offerings that match the identified attribute value of the candidate offering attribute. The processor can then provide the modified bid in an auction in which one of the offerings that match the identified attribute value of the candidate offering attribute is participating.

In some implementations, the processor can identify an attribute value of a candidate offering attribute for which to establish a modified bid by identifying a plurality of offerings for which to provide a modified bid and determining an attribute value of a candidate offering attribute common to the plurality of offerings. In some implementations, the processor can identify an attribute value of a candidate offering attribute for which to establish a modified bid by identifying a particular offering for which to provide a modified bid and determining an attribute value of a candidate offering attribute unique to the particular offering.

In some implementations, the processor is further configured to analyze performance metrics associated with a plurality of offerings included in the content placement campaign, identify one or more of the plurality of offerings having performance metrics statistics below a predetermined threshold and determine, from the performance metrics statistics, a modified bid to establish for the one or more offerings identified as having performance metrics statistics below the predetermined threshold.

In some implementations, the processor is further configured to receive a modified bid from an entity managing the content placement campaign. In some implementations, the modified bid corresponds to a bid modifier configured to modify a base bid value associated with a partition group of the content placement campaign.

In some implementations, to establish a modified bid, the processor can establish a secondary content placement campaign in which offerings associated with the identified attribute value of the candidate offering attribute are included in a single partition group and assign the modified bid to the single partition group. In some implementations, the processor can assign the secondary content placement campaign a campaign priority level higher than a campaign priority level of the content placement campaign.

In some implementations, the processor is further configured to monitor auction related data of auctions in which the offerings participated. The processor can identify, for one or more offering attributes, trends relating to the performance of the offerings. The processor can then determine, from the identified trends, a potential opportunity to modify the performance of the offerings for which the trend was identified.

In some implementations, the processor is further configured to identify a bid modification policy for applying the modified bid, identify that a condition of the bid modification policy has been met and select the modified bid to provide in an auction in which one of the offerings that match the identified attribute value of the candidate offering attribute is participating.

According to another aspect, a computer readable storage medium having instructions to provide information via a computer network. The instructions include instructions to identify a content placement campaign including a plurality of partition groups including one or more offerings characterized by one or more offering attributes. Each of the partition groups can correspond to an attribute value of an offering attribute and have an associated bid value. The processor can instructions include instructions to identify an attribute value of a candidate offering attribute for which to establish a modified bid and establish, for the identified attribute value of the candidate offering attribute, a modified bid corresponding to one or more offerings that match the identified attribute value of the candidate offering attribute. The instructions include instructions to provide the modified bid in an auction in which one of the offerings that match the identified attribute value of the candidate offering attribute is participating.

In some implementations, the instructions include further instructions to identify an attribute value of a candidate offering attribute for which to establish a modified bid by identifying a plurality of offerings for which to provide a modified bid and determining an attribute value of a candidate offering attribute common to the plurality of offerings. In some implementations, the instructions include further instructions to identify an attribute value of a candidate offering attribute for which to establish a modified bid by identifying a particular offering for which to provide a modified bid and determining an attribute value of a candidate offering attribute unique to the particular offering.

In some implementations, the instructions include instructions to analyze performance metrics associated with a plurality of offerings included in the content placement campaign, identify one or more of the plurality of offerings having performance metrics statistics below a predetermined threshold and determine, from the performance metrics statistics, a modified bid to establish for the one or more offerings identified as having performance metrics statistics below the predetermined threshold.

In some implementations, the instructions include instructions to receive a modified bid from an entity managing the content placement campaign. In some implementations, the modified bid corresponds to a bid modifier configured to modify a base bid value associated with a partition group of the content placement campaign.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 shows a portion of an advertising auction log.

FIGS. 6A-6C are screenshots of a user interface through which a user can manage a content placement campaign;

FIG. 9 is a block diagram illustrating an implementation of a general architecture for a computer system that may be employed to implement various elements of the systems and methods described and illustrated herein.

DETAILED DESCRIPTION

Figure 1A:
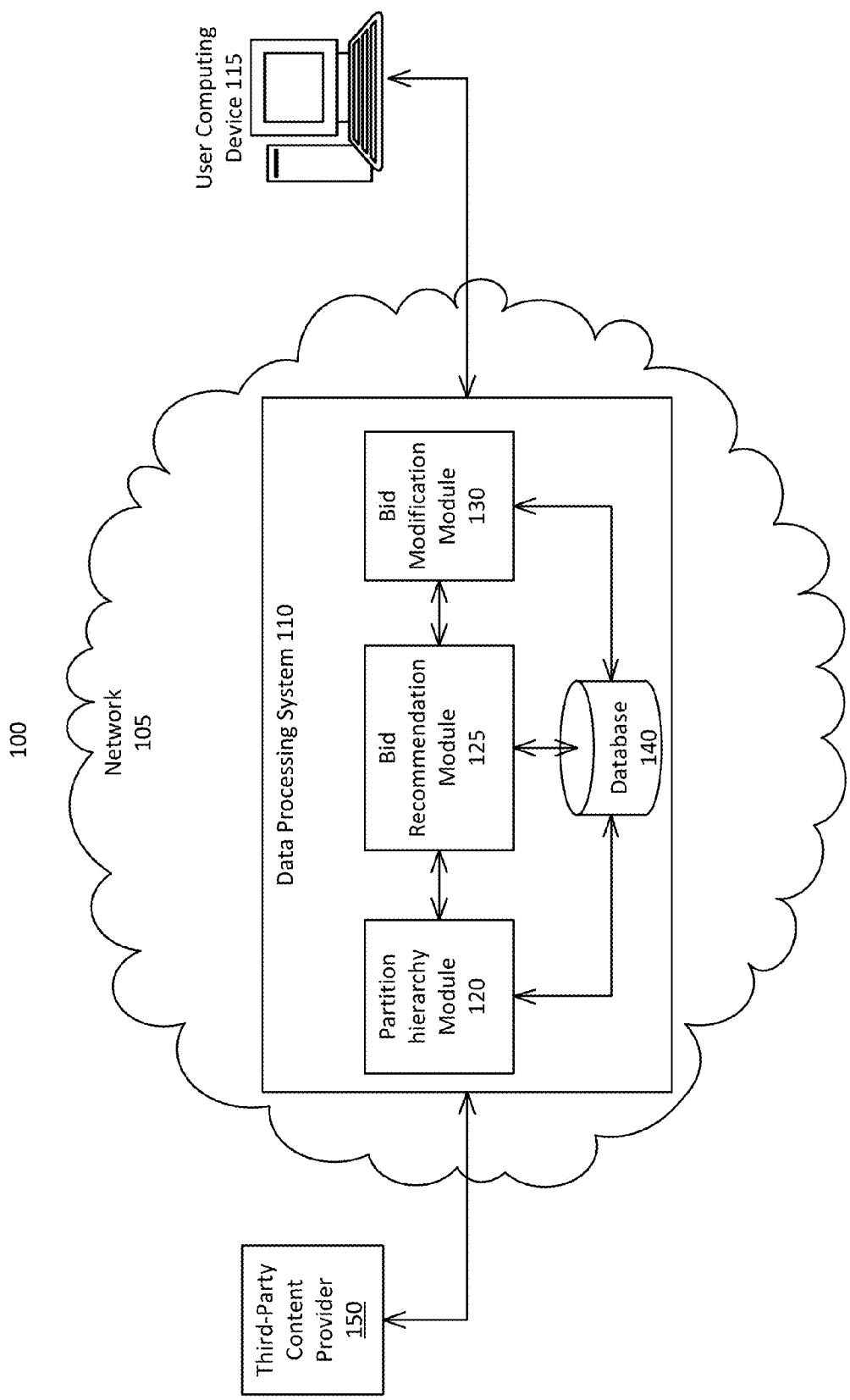
FIG. 1A is a block diagram depicting one implementation of an environment for hierarchically partitioning a data set including a plurality of offerings, according to an illustrative implementation.

Following below are more detailed descriptions of various concepts related to, and implementations of, methods, apparatuses, and systems for hierarchically partitioning a data set including a plurality of offerings, providing bid recommendations for one or more partition groups including one or more offerings of the partitioned data set and for providing a modified bid in an auction. The various concepts introduced above and discussed in greater detail below may be implemented in any of numerous ways, as the described concepts are not limited to any particular manner of implementation. Examples of specific implementations and applications are provided primarily for illustrative purposes.

The present disclosure provides new and improved mechanisms to take a potentially large set of offerings or products (for example, the inventory of a merchant) and divide the large set incrementally into non-overlapping subsets based on different properties or attributes (for example, product category, brand, condition, price, etc.) of the products. These properties or attributes can be referred to as "product dimensions" and the sets of products can be referred to as "partition groups". The initial set of products can be referred to as the "product scope." The present disclosure provides solutions to identify individual product partition groups from the large set of products, as a result of a stepwise partitioning process. The products or offerings in each of the product partition groups can then be treated the same based on the partition group to which they belong. In the context of content placement (for example, advertising), merchants can be able to provide one bid for the products in the most granular product partition groups and access corresponding reporting data (clicks, impressions, etc.) for the product partition groups. The mechanisms to take a potentially large set of offerings or products and divide the large set incrementally into non-overlapping subsets based on different properties or attributes of the products provide a scalable way to partition a set of product offers in one or more arrangements that match the needs of the merchant or other entity associated with the large set of offerings or products. In some implementations, a data processing system can hierarchically partition a data set based on partitioning criteria received from the merchant. The partitioning criteria can identify attributes according to which to partition the products, the order of each of the attributes and the granularity of each of the attributes across which the offerings are to be partitioned. In some implementations, the granularity can identify a number of partition groups to form for each attribute. In some implementations, the partition criteria can also identify specific values for the partition groups of each of the attributes. In some implementations, the data processing system can determine, from one or more of the offerings or one or more declared or implicit goals of the merchant, attribute values of an attribute across which to partition the offerings. Additional details regarding hierarchically partitioning a plurality of offerings is described below with respect to Section A.

The present disclosure also provides new and improved mechanisms for managing bids corresponding to the large set of offerings by taking advantage of the product partition groups described above. In particular, the present disclosure provides new and improved mechanisms for recommending bid values to apply to one or more partition groups across which the offerings are divided. In some implementations, the data processing system can partition the offerings or products in a manner that is suitable for managing bids. Stated in another way, the data processing system may partition the offerings or products in such a way that offerings for which the merchant would like to bid the same bid value are included in the same partition group. In some implementations, the data processing system can therefore partition the offerings based on auction related goals of the merchant. Additional details regarding bid management and recommendations for partition groups is described below with respect to Section B.

The present disclosure also provides new and improved mechanisms for utilizing bid modifiers to provide a merchant additional flexibility in managing a content placement campaign. Bid modifiers can be used to provide differentiation within offerings included within a single partition group by applying a bid modifier policy based on one or more attributes of the products. Additional details regarding the functionality and implementation of bid modifiers is described below with respect to Section C.

To the extent that any of the systems or functionalities described herein relate to receiving or collecting personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

A. Methods and Systems for Hierarchically Partitioning a Data Set

Methods and Systems for hierarchically partitioning a plurality of offerings into non-overlapping subsets based on different properties or attributes of the offerings are provided herein. The methods and systems described herein provide a scalable way to partition a set of product offers in one or more arrangements that match the needs of the merchant or other entity associated with the large set of offerings. In some implementations, a data processing system can hierarchically partition a data set based on partitioning criteria.

FIG. 1A is a block diagram depicting one implementation of an environment for hierarchically partitioning a data set including a plurality of offerings. In particular, FIG. 1A illustrates a system 100 for hierarchically partitioning a data set including a plurality of offerings. In particular, the system can be configured to hierarchically partition a data set including a plurality of offerings characterized by one or more offering attributes. The system 100 includes at least one data processing system 110. The data processing system 110 can include one or more processors and memory, i.e., a processing circuit. The memory can store processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic. The data processing system can include one or more computing devices or servers that can perform various functions. In some implementations, the data processing system can include an advertising auction system configured to host auctions. In some implementations, the data processing system does not include the content placement auction system but is configured to communicate with the content placement auction system via a network. The data processing system 110 can include one or more processors or other logic devices such as a computing device having a processor to communicate via a network 105 with at least one user computing device 115. In some implementations, the user computing device 115 and the data processing system 110 can communicate with one another via the network 105.

The network 105 may be any form of computer network that relays information between the user computing device 115, data processing system 110, a third-party content provider 150 and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The user computing device 115 may be any number of different user electronic devices, for example, a laptop computer, a desktop computer, a tablet computer, a smartphone, a digital video recorder, a set-top box for a television, a video game console, or any other computing device configured to communicate via the network 105. The user computing device can include one or more processors and a memory, i.e., a processing circuit. The memory can store machine instructions that, when executed by the processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The user computing device 115 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the user computing device 115 (e.g., a built-in display, microphone, etc.) or external to the housing of the user computing device 115 (e.g., a monitor connected to the user computing device 115, a speaker connected to the user computing device 115, etc.), according to various implementations. For example, the user computing device 115 may include an electronic display, which visually displays web pages using webpage data received from one or more content sources and/or from the data processing system 110 via the network 105. In some implementations, the user computing device 115 can display a user interface through which a third-party content provider can communicate with the data processing system 110. In some implementations, the third-party content provider 150 can be configured to manage one or more content placement campaigns via a user computing device similar to the user computing device 115.

The data processing system 110 can include at least one server. In some implementations, the data processing system 110 includes a partition hierarchy module 120, a bid recommendation module 125 and a bid modifier module 130. The data processing system 110 can also include one or more content repositories or databases 140.

Figure 1B:
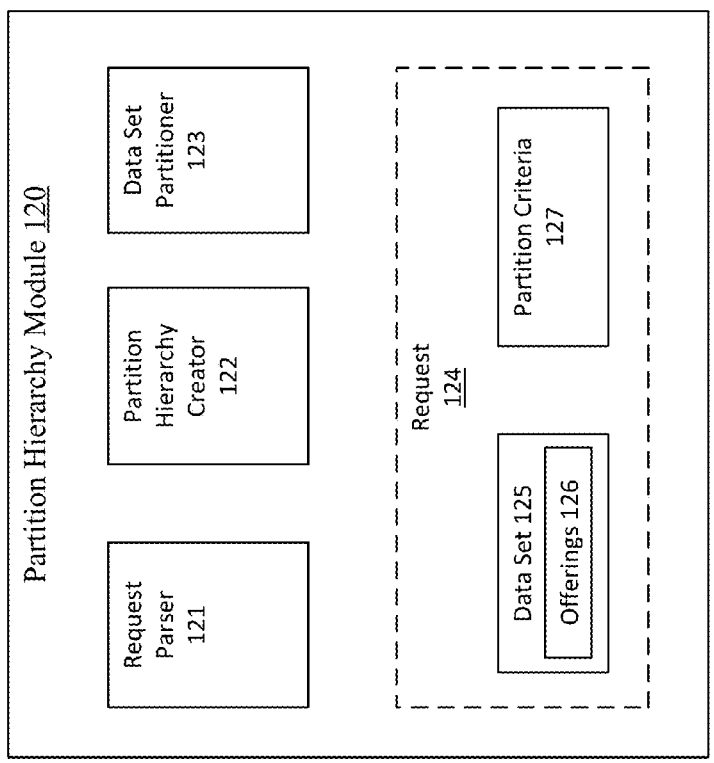
FIG. 1B is a block diagram depicting one implementation of a partition hierarchy module for hierarchically partitioning a data set including a plurality of offerings

Referring now also to FIG. 1B, a block diagram depicting one implementation of the partition hierarchy module is shown. The partition hierarchy module 120 can be designed, constructed or configured to hierarchically partition a data set including a plurality of offerings characterized by one or more offering attributes. The partition hierarchy module 120 can include a request parser 121, a partition hierarchy creator module 122 and a data set partitioner 123. In addition, the partition hierarchy module 120 can be configured to process one or more requests 124 to hierarchically partition a data set. The request can include or identify one or more of a data set 125 including a plurality of offerings 126 and a partition criteria 127 according to which the data set is to be partitioned.

The offerings 126 in the data set 125 can be products, services, or any other offering that can be selected for display as content. Examples of products can include products that are being sold by a retailer, for example, books, clothes, electronics, or any other product that can be purchased, used, borrowed, amongst others. Examples of services can include airline tickets, bus tickets, hotel rooms, or any other service that can be characterized by one or more attributes. Using products as an example of the offerings 126, products can be characterized by one or more product attributes, each of which can have one or more attribute values. These attribute values can be specific to the product attribute. Examples of product attributes and their corresponding attribute values (shown in parenthesis) include, by way of example, product condition (new, used, refurbished), a product category (electronics, home and garden, fashion, apparel), a product subcategory of a given product category (TVs, DVDs, plants, lipsticks, outerwear, shirts), a product price (free, $0.99, $1-$10, more than $500), a product color (red, blue, green), amongst others. Using hotel rooms as another example of offerings 126, hotel rooms can be characterized by one or more attributes, each of which can have one or more attribute values. These attribute values can be specific to a specific attribute. Examples of attributes and their corresponding attribute values (shown in parenthesis) include, by way of example, hotel rating condition (1 star, 2 star, 3 star, 4 star, 5 star), a hotel distance from city center (less than 0.5 miles, more than 0.5 miles and less than 5 miles, more than 5 miles), hotel room type (king, queen, deluxe, suite), hotel room price (less than $100, between $101 and $250 and more than $250), amongst others.

Some attributes can be of hierarchical nature. For instance, the product category can include multiple levels and each level can be represented by an individual attribute that can be used to partition the offerings further. For example, the attribute Product Category can contain multiple levels and each level can be represented by an attribute that can be used to partition the plurality of offerings further (for example, apparel>shoes>sandals). In some implementations, the advertiser can divide its inventory only at the first level, placing differentiated bids on apparel, electronics, home & garden, and others, or can go down to the second level with different bids for dresses, coats, shoes, underwear, and the like. There are also multiple definitions of the product category attribute, which may be available as options to choose from. One example product category attribute can be provided by the advertiser themselves. That is, the advertiser may have their own product taxonomy which they provide to the data processing system and use as an attribute to partition the offerings. Another example product category can be defined by a third-party but provided to the data processing system 110 by the advertiser. The advertiser can use the third-party's standard product taxonomy identifying, for each of their offerings, the category in which the product fits. In some implementations, the product category attribute can be defined and inferred by the data processing system 110: The advertiser can use a standard product taxonomy of the data processing system and rely on the data processing system to automatically classify each of the offerings into the correct category.

In some implementations, there may also be multiple definitions of the product brand attribute. For example, the brand attribute can include values based on raw brands provided by the merchant. In another example, the data processing system 110 can infer a canonicalized brand. In some implementations, the data processing system 110 can cluster or correlate multiple spellings of the brand into one. The multiple spellings can be the result of different operators having inputted the brand (for example, NIKE and Nike, Apple and Apple, Inc), or variations in how a brand is spelled across countries (for example, Danone and Dannon).

In some implementations, there may also be multiple definitions of the product price attribute. In some implementations, the product price values can be based on generic price ranges defined by the data processing system 110. In this way, using generic price ranges allows the advertiser to compare various metrics for the same price range across other dimensions. In some implementations, the product price values can be based on custom price ranges defined by the advertiser for each partition group division.

Examples of other candidate offering attributes can include product condition (new, refurbished, used), product identifiers, which is the actual unique identifier of a product through which advertisers can bid separately product by product. Other attributes that can be used as candidate offering attributes for partition can include custom attributes specific to an advertiser. The advertiser can specify custom attributes that are specific to their business to their offerings and can use these custom attribute to partition the offerings across different partition groups. For instance, the advertiser can indicate, for each product, whether it is a high, medium or low margin product, and then use that attribute to bid, in a particular partition group, 45 cents on high margin products, 40 cents on medium margin products, and 35 cents on low margin products. Other examples of custom attributes can include fast moving or slow moving products, seasonal products, overstocked products and low inventory products, amongst others.

In some implementations, the data set 125 can include an inventory listing of a merchant, retailer, advertiser, or any other entity that desires to partition the offerings 126 into a plurality of partition groups. In some such implementations, the merchant may desire to partition the offerings 126 into a plurality of non-overlapping partition groups. This can be possible if each of the offerings 126 corresponds to only one attribute value for each of the offering attributes according to which the data set 125 is partitioned. In some implementations, an offering 126 may correspond to more than one attribute value for a particular offering attribute. In some such implementations, the partition hierarchy module 120 may implement one or more rules for determining which attribute value dominates.

Figure 2A:
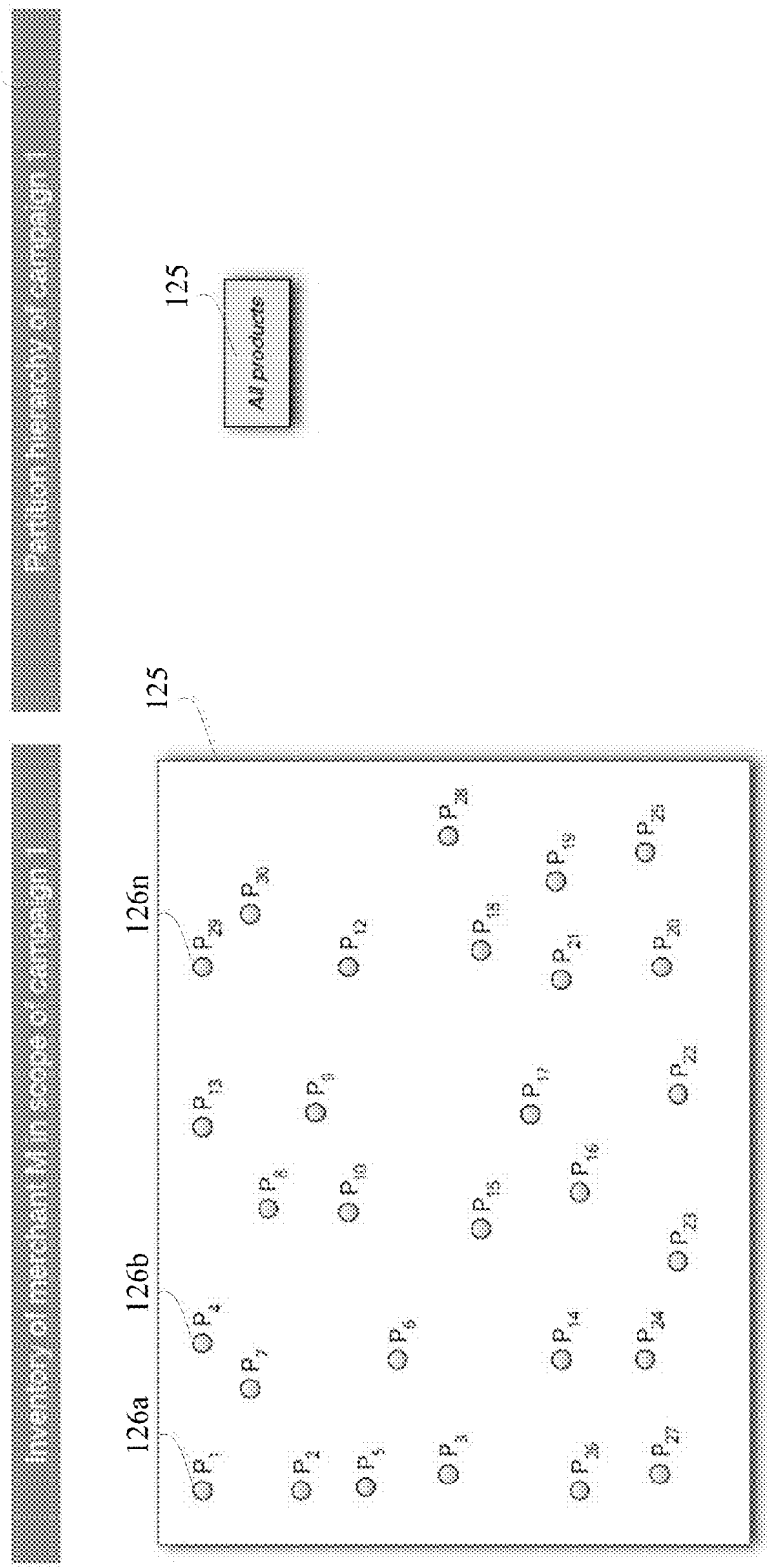
FIGS. 2A-2C are block diagrams representing the flow for hierarchically partitioning a data set including a plurality of offerings.
Figure 2B:
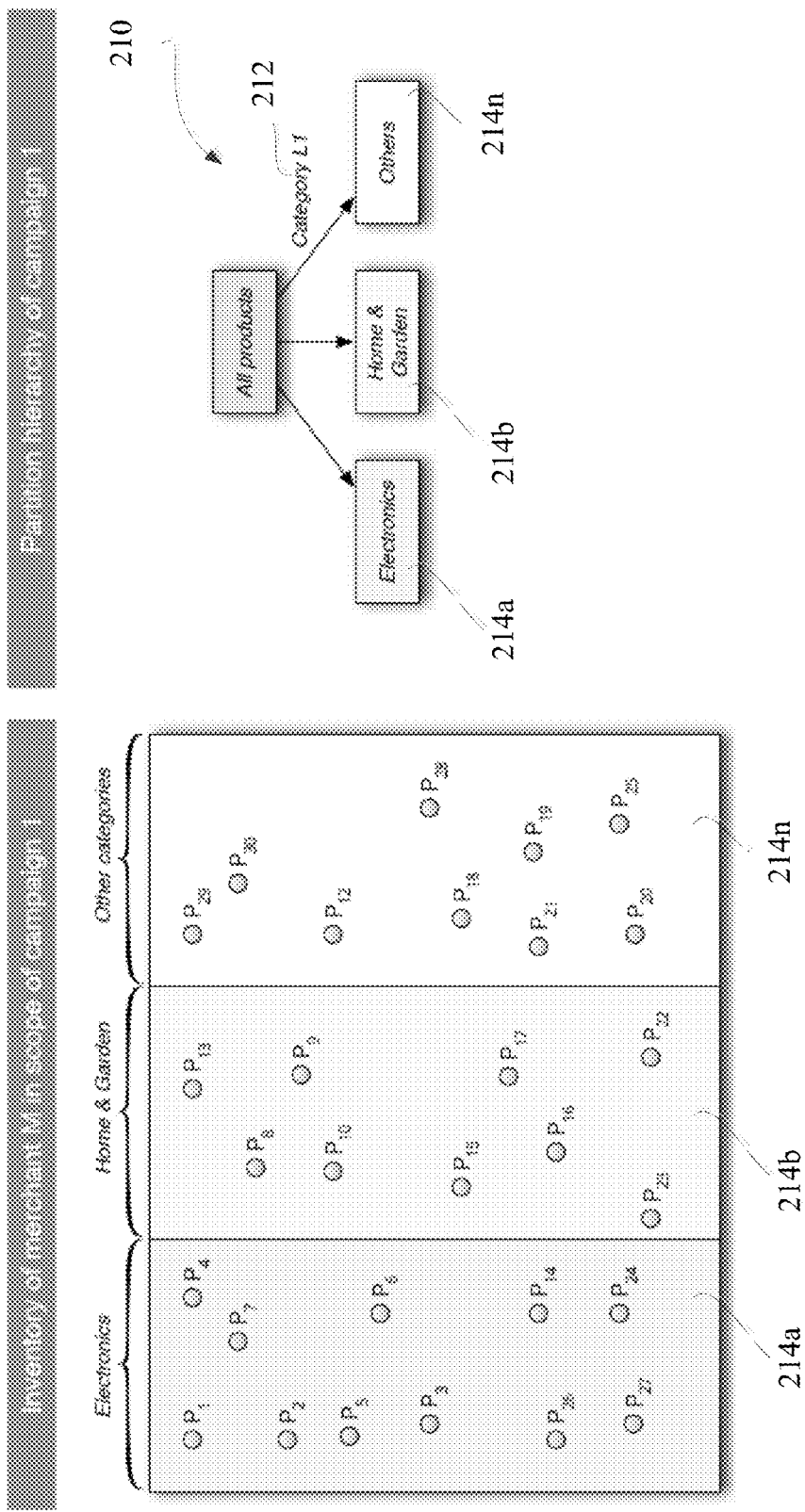
Figure 2C:
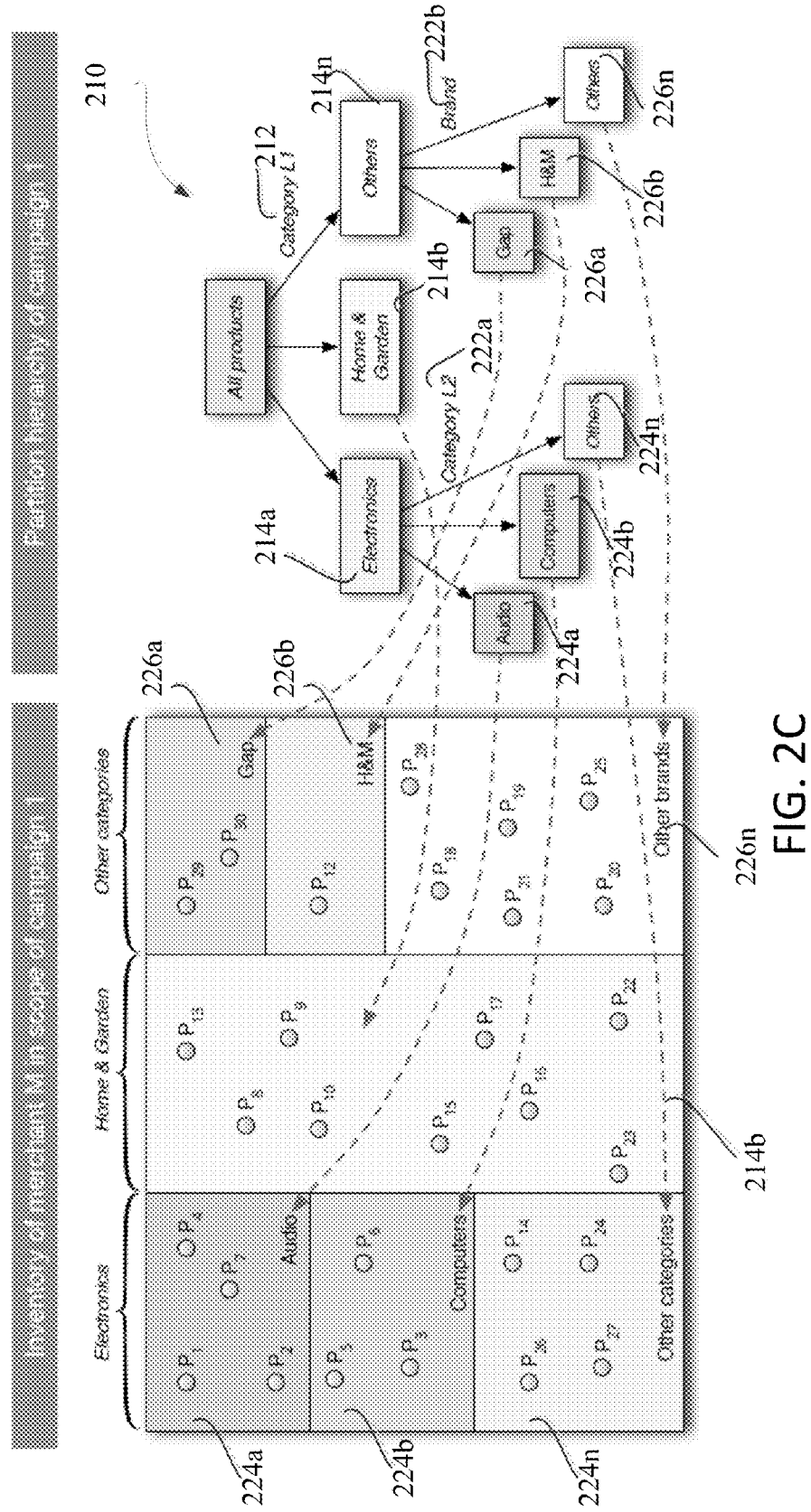

Referring now also to FIGS. 2A-2C, block diagrams representing the flow for hierarchically partitioning a data set including a plurality of offerings is shown. As shown in FIG. 2A, a data set 125 including a plurality of offerings 126a-126n is shown. The data set 125 can correspond to an entire inventory of a merchant or a subset of the merchant's entire inventory. In some implementations, the data set 125 can correspond to a subset of the inventory that a merchant desires to use in a content placement campaign. On the right, a node "All products" of a partition hierarchy decision tree 210 is shown. The node represents the data set 125.

As shown in FIG. 2B, the plurality of offerings 126 are partitioned into a plurality of attribute values corresponding to a candidate offering attribute. In the example shown in FIG. 2B, the candidate offering attribute is "Product Category" 212 and the attribute values corresponding to the partition groups 214a-214n are "Electronics" 214a, "Home & Garden" 214b and "Others" 214n. The partition hierarchy decision tree 210 represents the division of the "All products" node into three separate attribute value nodes 214a, 214b, 214n corresponding to the candidate offering attribute "Product Category" 212. Each of the partition groups can include at least one offering 126.

As shown in FIG. 2C, the offerings 126 in each of the partition groups "Electronics" 214a and "Others" 214n are further partitioned, while the partition group "Home & Garden" 214b is not further partitioned. "Electronics" 214a is partitioned into a plurality of attribute values "Audio" 224a, "Computers" 224b and "Other Categories" 224n corresponding to a second candidate offering attribute called "Product SubCategory" 222a. The partition group "Others" 214n is partitioned into a plurality of attribute values "Gap" 226a, "H&M" 226b, and "Other Brands" 226n corresponding to a third candidate offering attribute "Brand" 222b. The partition hierarchy decision tree 210 represents the division of the "Electronics" node 214a into three separate attribute value nodes 224a, 224b, 224n corresponding to the candidate offering attribute "Product subcategory" 222a and the division of the "Others" node 214n into three separate attribute value nodes 226a, 226b, 226n corresponding to the candidate offering attribute "Brand" 222b. Each of the partition groups can include at least one offering 126.

As shown in FIG. 2C, the partition hierarchy decision tree 210 has three levels. The first level represents the plurality of offerings in the data set. The second level represents offerings in each of the three attribute values "Electronics" 214a, "Home & Garden" 214b and "Others" 214n. The third level represents offerings in each of the three subcategory specific attribute values 224 and three brand specific attribute values 226. Each of the offerings corresponds to one or more nodes in the partition hierarchy decision tree 210. Each offering can belong in no more than one node per level. In addition, any offering corresponding to a node at a higher level can only belong in a node at a lower level that branches from the node at the higher level. In this way, a hierarchy is established between nodes at different levels.

Referring back now also to FIG. 1B, the partition hierarchy module 120 can be configured to receive a request 124 to hierarchically partition a data set. In some implementations, the partition hierarchy module 120 can receive the data set 125 from a content provider, for example, a merchant, retailer or advertiser. In some implementations, the request can include the data set 125. In some implementations, the partition hierarchy module 120 can receive a request that identifies the data set to be partitioned. In some implementations, the request can also include a partition criteria 127 according to which the partition hierarchy module 120 is requested to partition the data set. The partition criteria 127 can identify one or more candidate offering attributes according to which to partition the data set 125. In some implementations, the partition criteria 127 can include a hierarchy level of the candidate offering attributes indicating the order of the candidate offering attributes across which the data set is to be partitioned. In some implementations, the partition criteria can specify the granularity at which to partition the data set across a respective candidate offering attribute. Stated in another way, the granularity represents the number of partition groups that will result from the partition across the respective candidate offering attribute. In some implementations, the partition criteria 127 can also specify attribute values corresponding to each of the respective candidate offering attributes across which to partition the offerings 126. In some implementations, the partition criteria can include one or more goals that can be utilized by the partition hierarchy module 120 to determine the attribute values corresponding to each of the respective candidate offering attributes across which to partition the offerings 126.

The partition hierarchy module 120 can implement top-down hierarchical partitioning in which the offerings are first partitioned into a plurality of attribute values based on a first candidate offering attribute having a highest hierarchy level. Each of the attribute values of the candidate offering attribute according to which the offerings are partitioned corresponds to a partition group that includes a subset of the offerings of the data set. Once the offerings are partitioned based on the first candidate offering attribute, the offerings can be further partitioned based on candidate offering attributes having the next highest hierarchy level, and so forth, until the offerings in a partition group can no longer be further partitioned or based on the number of hierarchy levels indicated in the request.

The request parser 121 can be configured to receive requests from one or more merchants that desire to partition one or more data sets. The request parser 121 can parse the request to hierarchically partition a data set. The request parser 121 can parse the request by identifying the data set to be partitioned and a partition criteria associated with the request. The request parser 121 can be configured to communicate with the merchant via a user interface presented on a computing device of the merchant. Through the user interface, the merchant can create and submit a request. The merchant can also create a partition criteria via the user interface.

The partition hierarchy creator 122 can be configured to analyze the received data set and determine one or more possible candidate offering attributes according to which the data set can be partitioned. In some implementations, the partition hierarchy creator 122 can identify the types of offerings included in the data set and based on the identity of the offerings, determine one or more possible candidate offering attributes according to which the data set can be feasibly partitioned.

In some implementations, the partition hierarchy creator 122 can be configured to determine one or more possible candidate offering attributes according to which the data set 125 can be feasibly partitioned by identifying campaigns having data sets similar to the received data set 125. In some implementations, the partition hierarchy module 120 can manage campaigns corresponding to one or more data sets associated with one or more other merchants or content providers. The partition hierarchy creator 122 can identify the partition hierarchy of such campaigns. The partition hierarchy creator 122 can then propose or suggest possible candidate offering attributes according to which the data set 125 can be partitioned.

In some implementations, the partition hierarchy creator 122 can be configured to propose or suggest one or more predefined candidate offering attributes based on the offerings 126 included in the data set 125. These candidate offering attributes may be industry specific. As such, the partition hierarchy creator 122 can be configured to determine one or more industries of the offerings of the data set by analyzing attribute values of the offerings 126 in the data set 127. In some implementations, the attribute values such as name, category, subcategory, and brand can be used to identify the industry of each of the offerings 126.

In some implementations, the partition hierarchy creator 122 can be configured to propose candidate offering attributes by identifying competitors of the merchant. In some implementations, the partition hierarchy creator 122 can identify competitors by identifying the offerings in the data set and identifying, for each offering, a list of competitors that have participated in auctions for the same offering. The partition hierarchy creator 122 can then identify a number of offerings of the data set for which each competitor has bid. The competitors who have bid on the most number of offerings can be identified and the partition hierarchy creator 122 can identify the candidate offering attributes according to which the competitor has partitioned their data set. In some implementations, the partition hierarchy creator 122 can identify a portion of the data set of the competitor that closely matches the data set 125 to be partitioned and identify the candidate offering attributes according to which the competitor partitioned the portion.

In some implementations, the partition hierarchy creator 122 can be configured to assign a partition hierarchy level to each of the candidate offering attributes. The partition hierarchy level of a candidate offering attribute indicates a hierarchy of the offering attribute relative to other candidate offering attributes and establishes the order in which the offerings are going to be partitioned. In some implementations, the partition hierarchy creator 122 can receive the partition hierarchy level of the candidate offering attributes according to which the offerings can be partitioned. In some implementations, the partition criteria 127 can identify a partition hierarchy level along with the candidate offering attributes according to which the offerings can be partitioned.

In some implementations, the partition hierarchy creator 122 can determine the partition hierarchy level of the candidate offering attributes. In some such implementations, the partition hierarchy creator 122 can identify one or more goals associated with the plurality of offerings. In some implementations, the goals associated with the offerings can be received from the merchant. In some implementations, the goals can be performance metric goals, for example, to increase impression share or for the offerings to have an impression share above a predetermined threshold. In some implementations, a goal can be to create partition groups that can facilitate better control and management of bids based on the performance of third-party content corresponding to the offerings. Stated in another way, the partition hierarchy creator 122 can determine partition hierarchy levels that would provide the merchant with partition groups that include offerings that are likely to be treated similarly. For example, the partition hierarchy creator 122 can determine partition hierarchy levels that would provide partition groups that include offerings 126 for which the merchant would like to place a certain bid value. As described below with respect to Section C, in some implementations, the partition hierarchy module 120 can use bid modifiers to treat some of the offerings 126 in the partition group differently without having to establish a separate partition group for every offering associated with a unique bid value.

In some implementations, the partition criteria 127 can identify the attribute values of the candidate offering attributes according to which the offerings are to be partitioned. In some implementations, the partition hierarchy creator 122 can be configured to determine one or more attribute values of the candidate offering attributes according to which the offerings can or should be partitioned. In some implementations, the partition hierarchy creator 122 can be configured to propose or suggest the determined attribute values of one or more candidate offering attributes according to which the offerings can be partitioned.

In some implementations, the partition hierarchy creator 122 can determine a plurality of attribute values for a candidate offering attribute by identifying one or more performance metrics goals associated with the offerings and determining, based on the performance metric goals, attribute values according to which the offerings can be partitioned to meet those goals.

In some implementations, the partition hierarchy creator 122 can identify, from the data set, each of the attribute values for a candidate offering attribute. The partition hierarchy creator 122 can then determine a number of offerings corresponding to each of the identified attribute values. The partition hierarchy creator 122 can then select one or more attribute values from the identified attribute values having a number of offerings that exceed a threshold number of offerings for partitioning the plurality of offerings.

In some implementations, the partition hierarchy creator 122 can be configured to determine a plurality of attribute values for a candidate offering attribute by identifying each of the attribute values associated with the candidate offering attribute according to which the plurality of offerings is to be partitioned. The partition hierarchy creator 122 can then identify, from historical auction data for each offering, the most popular attribute values. In some implementations, the partition hierarchy creator 122 can identify a predetermined number of top performing or most popular attribute values, for example, top 5 most popular attribute values.

In some implementations, the partition criteria 127 can specify the granularity for each candidate offering attribute. The granularity corresponds to the number of attribute values of a candidate offering attribute across which to partition the offerings. In some implementations, the partition hierarchy creator 122 can use heuristics to identify the attribute values for partitioning the offerings. In some implementations, the partition hierarchy creator 122 can identify the attribute values for which at least 50% of clicks on content associated with the offering have been covered.

The historical auction data can be data associated with the historical auction performance data of the plurality of offerings. In some implementations, the historical auction data is specific to auctions in which the merchant associated with the data set participated. In some implementations, the offering can have an offering identifier that can be assigned by the data processing system 110 and allows the data processing system 110 to monitor and record the performance of the offering across multiple merchants. Although the quality of the data based on the activities of other merchants may not be as good as the quality of data based on activities of the merchant associated with the request, the data can be used to estimate the performance of the offering of the merchant, amongst others.

In some implementations, the partition hierarchy creator 122 can combine a plurality of attribute values to form a combination attribute value. For example, for the candidate offering attribute "Brand", the attribute values can include Porsche, Maserati, Ferrari, Honda, Toyota, Nissan, and Others. The partition hierarchy creator 122 can combine Porsche, Maserati and Mercedes together to form a "Luxury Brands" attribute value and combine Honda, Toyota and Nissan together to form an "Economy Brands" attribute value, where all other values are aggregated in the catch-all partition group. In this way, offerings associated with Luxury Brands can be treated in a first manner, while offerings associated with Economy Brands can be treated in a second manner, and so forth.

In some implementations, at least one of the plurality of attribute values according to which the offerings are to be partitioned corresponds to a discrete attribute value associated with a particular attribute. In some implementations, at least one of the plurality of attribute values according to which the offerings are to be partitioned corresponds to a range of attribute values associated with a particular attribute. In some implementations, a range of attribute values can be associated with certain candidate offering attributes, for example, product price. Conversely, in some implementations, at least one of the plurality of attribute values according to which the offerings are to be partitioned corresponds to a combination of discrete attribute values associated with a particular attribute. For example, the combination of attribute values can be associated with candidate offering attributes having a number of discrete attribute values, for example, brands, subcategories, colors and the like.

In some implementations, the partition hierarchy creator 122 can be configured to rely on information stored in databases, servers, web servers and libraries to come up with logical groupings for attribute values. Other groupings other than luxury brands, economy brands can include groupings related to subcategories. For example, offerings related to TVs, DVDs, Home Theater Systems can be grouped together under "Home Entertainment".

In some implementations, the partition hierarchy creator 122 can identify one or more statistically significant trends associated with the candidate offering attribute according to which the offerings are to be partitioned. In some implementations, the trends may be based on a bidding history associated with the offerings. In some such implementations, the partition hierarchy creator 122 can determine that offerings associated with a particular attribute value have a first range of bids, offerings associated with another attribute value have a second range of bids and so forth. In some implementations, the partition hierarchy creator 122 may determine that the attribute values corresponding to each of the range of bids can be used for partitioning the offerings. For example, the partition hierarchy creator 122 can determine that offerings included in an Electronics partition group have average bid values ranging from $0.30 to $5. Further, the partition hierarchy creator 122 determines that offerings corresponding to Samsung have average bid values between $4 and $5, offerings corresponding to Apple have bid values between $1 and $3.99 and all other brands have bid values between $0.3 and $0.99. In such a scenario, the partition hierarchy creator 122 can determine the attribute values of the candidate offering attribute corresponding to Brand can be Samsung, Apple and Other brands, respectively.

In some implementations, the partition hierarchy creator 122 can identify trends associated with the candidate offering attribute according to which the offerings are to be partitioned by iteratively determining if any statistically significant trends are formed based on any combination of attribute values. Examples of combination of attribute values include luxury brands, economy brands and home entertainment and are provided above.

In some implementations, the partition hierarchy creator 122 can be configured to determine the attribute values of one or more candidate offering attributes based on a partition criteria 127 that identifies the candidate offering attributes $[A_1 \ldots A_n]$ according to which to partition the data set, the respective hierarchical level of each of the candidate offering attributes and the number of attribute values $[n_1 \ldots n_n]$ for each candidate offering attribute $[A_1 \ldots A_n]$. In some such implementations, the partition hierarchy creator 122 can partition the plurality of offerings across $n_1$ partition groups of a first candidate offering attribute $A_1$. The partition hierarchy creator 122 can first identify all available attribute values $[v_1 \ldots v_n]$. For each attribute value $[v_1 \ldots v_n]$, the partition hierarchy creator 122 can then compute metrics which can be used for making a decision on which of the available attribute values $[v_1 \ldots v_n]$ are to be selected to be the $n_1$ attribute values across which the plurality of offerings is to be partitioned. In some implementations, the metrics used for making the decision on which of the available attribute values are to be selected to be the $n_1$ attribute values can include the number of offers with that value, the number of impressions/clicks for offers with that value, the average cost per click for offers with that value, the cost per conversion for offers with that value, and the like.

In some implementations, the partition criteria 127 can include one or more goals of the merchant. For instance, the goal of the advertiser can be to primarily promote popular products. If the partition criteria 127 identifies Brand to be one of the candidate offering attributes and specifies that n individual brands should be selected, the partition hierarchy creator 122 can compute for each brand value the number of clicks, offers of that brand had received over a predetermined time period, for example, in the past 30 days. The partition hierarchy creator 122 can then identify the top n brands based on this metric. This way, the n most popular brands would be broken out into separate partition groups. In this way, the advertiser can place individual bids on a brand by brand basis and also be able to get brand-specific reporting metrics. In some implementations, the top n−1 brands may be selected so as to include a catch-all partition group in which offerings of all other brands can be grouped together.

The partition hierarchy creator 122 can be configured to establish a partition hierarchy decision tree according to which the offerings can be partitioned into the various partition groups. The partition hierarchy creator 122 creates or establishes the partition hierarchy decision tree including each of the candidate offering attributes and the attribute values associated with each of the candidate offering attributes.

The data set partitioner 123 can be configured to partition the offerings throughout the partition hierarchy decision tree established by the partition hierarchy creator 122. In some implementations, the data set partitioner 123 can partition the offerings one level at a time starting at the highest hierarchy level and moving down a level per iteration. As such, the data set partitioner 123 can be configured to first partition the plurality of offerings included in the data set across the plurality of attribute values corresponding to the candidate offering attribute having the highest hierarchy level. As shown in FIG. 2C, the candidate offering attribute "Category" has the highest hierarchy level. The data set partitioner 123 can determine, for each offering, an attribute value associated with the candidate offering attribute and identify that the offering is associated with the attribute matching the attribute value. If the attribute value of the offering does not match any of the attribute values of the candidate offering attribute specified in the partition hierarchy decision tree, the data set partitioner 123 can be configured to identify the offering with a catch-all partition group shown as "Others" 214n in FIG. 2C. In this way, every offering is identified with a partition group corresponding to the candidate offering attribute having the highest hierarchy level.

Once all the offerings of the data set have been identified with a partition group, the data set partitioner 123 recursively partitions the offerings included in each partition group corresponding to the attribute values of the candidate offering attribute having the highest hierarchy level. The offerings included in each partition group corresponding to the attribute values of the candidate offering attribute having the highest hierarchy level are then partitioned across a plurality of attribute values corresponding to the candidate offering attribute having the next highest hierarchy level.

In some implementations, each of the subsets of offerings included in the partition groups corresponding to the candidate offering attribute having the highest hierarchy level can be partitioned by the same candidate attribute entity. However, in some implementations, offerings included in different partition groups can be further partitioned based on different candidate offering attributes. As shown in FIG. 2C, offerings included in the partition group corresponding to attribute value "Electronics" is further partitioned based on the "Subcategory" offering attribute, while the partition group corresponding to the attribute value "Others" is further partitioned based on the candidate offering attribute "Brand." It should be appreciated that offerings in each of the partition groups 224a-224n and 226a-226n can be further partitioned based on another candidate offering attribute, for example, price, color, size, and the like.

In some implementations, the partition hierarchy module 120 can be configured to determine whether further partitioning a partition group can achieve the desired goals of the merchant. In some implementations, the partition hierarchy module 120 weighs the tradeoff between providing more control to the merchant and the complexity of the partition hierarchy decision tree 210.

In some implementations, the partition hierarchy module 120 can provide a structured content placement campaign for a large set of offerings. In particular, the data processing system can provide a structured content placement campaign by partitioning the plurality of offerings into non-overlapping subsets on which distinct bids can be placed.

In some implementations, the partition hierarchy module 120 can be configured to create and manage multiple content placement campaigns. In particular, the multiple campaigns can be assigned priorities to allow certain offerings of the plurality of offerings to be treated differently. In some implementations, the request received by the partition hierarchy module 120 can include a request to hierarchically partition a data set including a plurality of offerings according to two separate partition hierarchy decision trees. In some implementations, the request can identify a priority level of each of the partition hierarchy decision trees. By doing so, ambiguities that may arise due to incompatible partition hierarchy trees can be handled by associating priorities with each tree defining which trees partitions are to be used in case an offer is covered by multiple partition hierarchies.

Figure 3:
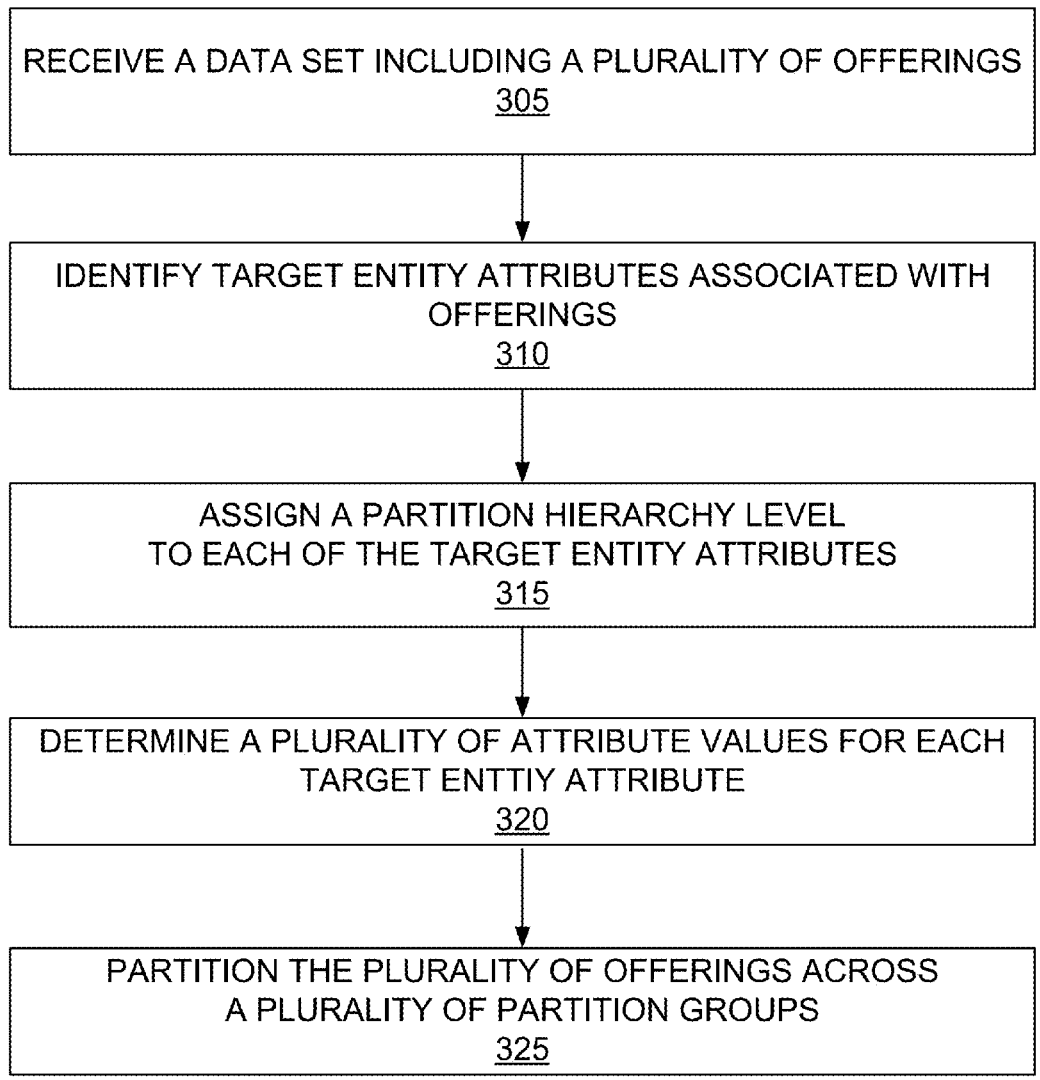
FIG. 3 is a flow diagram depicting one implementation of the steps taken to hierarchically partition a data set including a plurality of offerings.

FIG. 3 is a flow diagram depicting one implementation of the steps taken to hierarchically partition a data set including a plurality of offerings. In particular, FIG. 3 illustrates a flow diagram depicting a method 300 for hierarchically partitioning a data set including a plurality of offerings. In brief overview, the data processing system receives a data set including a plurality of offerings (BLOCK 305). The data processing system identifies candidate offering attributes associated with the offerings according to which the offerings are to be partitioned (BLOCK 310). The data processing system assigns a partition hierarchy level to each of the candidate offering attributes (BLOCK 315). The data processing system determines a plurality of attribute values for each candidate offering attribute (BLOCK 320). The data processing system partitions the plurality of offerings across a plurality of partition groups according to a hierarchical decision tree structure based on the partition hierarchy levels of the candidate offering attributes and the identified attribute values of each of the candidate offering attributes (BLOCK 325).

In further detail, a data processing system can receive a data set including a plurality of offerings (BLOCK 305). Each of the offerings can be characterized by one or more offering attributes. The offerings can be products available for sale by a merchant and the offering attributes can be attributes of the products. Examples of attributes of the products can include product condition, product price, product category, product type, product color, product rating, amongst others. In some implementations, the offerings can be hotel rooms. Examples of attributes related to hotel rooms can include hotel room price, hotel rating, hotel distance, hotel reviews, hotel type, hotel room type, amongst others.

The data processing system can receive a request to partition a data set from a merchant. The data set can include a plurality of product offerings characterized by a number of product attributes. The request can include a partition criteria based on which the data processing system can partition the data set. The partition criteria can identify the product attributes according to which to partition the data set is partitioned. The product attributes selected for partitioning the data set can be based on a merchant's goals. For example, the merchant may desire to partition products according to a particular attribute to gain insights regarding products based on the particular attribute. These insights can be related to bidding in auctions or reporting. The partition criteria can also identify an order for the product attributes according to which to partition the offerings. For example, the request and partition criteria can correspond to a request to first distinguish products of the data set by condition (new/used/refurbished), then split by category (electronics, home & garden, others), and finally, within a given category, by brand: The brands can vary based on the given category. In some implementations, the request can specify a granularity for each product attribute according to which to partition the products. In some implementations, the merchant defines the number of attribute values for each product attribute across which to distinguish or partition the products.

The data processing system can identify candidate offering attributes associated with the offerings according to which the offerings are to be partitioned (BLOCK 310). In some implementations, the data processing system can receive the candidate offering attributes along with the data set. In some implementations, the data processing system can determine one or more suitable candidate offering attributes by analyzing the offerings in the data set. In some implementations, the data processing system can analyze the offerings in the data set by identifying one or more attribute values of each of the candidate offering attributes, determining a number of product offerings belonging to each of the attribute values, and determining if the candidate offering attribute is suitable for partitioning the plurality of offerings based on the number of product offerings belonging to each of the attribute values. The attribute values are discrete states with which a product offering can be associated. For example, using product price as an example attribute, examples of attribute values can include the price of each of the offerings and can also include discrete price ranges corresponding to one or more offerings. However, the attribute values should not overlap one another. As such, the price ranges can be less than $10, greater than or equal to $10 and less than $50, and greater than $50. In some implementations, one of the attribute values can be "Other."

In this way, any offerings that do not belong to any of the predefined attribute values can be grouped together under the attribute value "Other."

The data processing system can assign a partition hierarchy level to each of the candidate offering attributes (BLOCK 315). The partition hierarchy level of a candidate offering attribute indicates a hierarchy of the offering attribute relative to other candidate offering attributes and establishes the order in which the offerings are going to be partitioned. In some implementations, the data processing system can receive a partition hierarchy level along with the plurality of offerings. In some implementations, the data processing system can assign the partition hierarchy level by determining the order in which to partition the plurality of offerings. In some such implementations, the data processing system can identify one or more goals associated with the plurality of offerings. For example, a merchant selling a plurality of products may have a goal to increase the number of impressions or increase the number of click throughs. In some implementations, the data processing system can determine partition hierarchy levels that would allow the formation of partition groups that can facilitate better control and management of bids based on the performance of ads corresponding to the offerings.

The data processing system can determine a plurality of attribute values for each candidate offering attribute (BLOCK 320). In some implementations, the data processing system can determine a plurality of attribute values for each candidate offering attribute by identifying one or more performance metrics goals associated with the offerings and determining, based on the performance metric goals, a plurality of attribute values according to which the offerings are to be partitioned. In some implementations, the data processing system can identify, from the data set, each of the attribute values for a candidate offering attribute. The data processing system can then determine a number of offerings corresponding to the identified attribute value for each of the identified attribute values and select one or more attribute values having a number of offerings that exceed a threshold number of offerings for partitioning the plurality of offerings.

In some implementations, the data processing system can identify bid history associated with the offerings and determine, from the bid history, one or more bid value ranges. The bid value ranges can include one or more average bid values associated with the attribute values. The data processing system can then group attribute values corresponding to a bid value range of the bid value ranges.

In some implementations, at least one of the plurality of attribute values according to which the offerings are to be partitioned corresponds to a discrete attribute value associated with a particular attribute. In some implementations, at least one of the plurality of attribute values according to which the offerings are to be partitioned corresponds to a range of attribute values associated with a particular attribute.

The data processing system can partition the plurality of offerings across a plurality of partition groups according to a hierarchical decision tree structure based on the partition hierarchy levels of the candidate offering attributes and the identified attribute values of each of the candidate offering attributes (BLOCK 325). Each of the partition groups can correspond to a respective identified attribute value. In some implementations, the offerings are partitioned across a plurality of attribute values corresponding to the candidate offering attribute assigned the highest partition hierarchy level. Once the offerings are partitioned according to this offering attribute, the plurality of offerings in one or more of the partition groups corresponding to the attribute values of the candidate offering attribute assigned the highest partition hierarchy level are further partitioned across a plurality of attribute values corresponding to respective offering attributes assigned the next highest partition hierarchy. The data processing system can further partition one or more of the partition groups based on additional candidate offering attributes assigned lower partition hierarchy levels.

In some implementations, the data processing system can partition the data set in a hierarchical, top-down fashion. In some implementations, the data processing system can start with a first product attribute $A_1$ and identify up to $N_1$ attribute values for which there is at least one product offer. The data processing system can employ one or more techniques or strategies for picking such attribute values. For example; the data processing system may use the attribute values for which there are the largest number of products or stated in another way, the top partition group count. The data processing system can also use attribute values for which there are the largest number of impressions or clicks or stated in another way, the top performing partition groups. In some implementations, the data processing system may use attribute values for which the bid benchmarks are most diverse. In this way, offerings that can benefit from having similar bid strategies can be partitioned together, while offerings that can benefit from having different bid strategies can be partitioned separately. In some implementations, the data processing system can select a technique or strategy for determining attribute values depending on a goal that the merchant can define. In some implementations, the goals of the merchant can be abstract, for example, the goal may relate to getting as many impressions possible.

The data processing system can then iterate through each of the $n_1$ different partition groups. This can be done by further partitioning the offerings in each of the $n_1$ different partition groups using a second candidate product attribute $A_2$. The data processing system can recursively continue to partition the offerings until there is either no further partition group subdivision possible, or the number of candidate product attributes identified in the partition criteria has been reached.

B. Methods and Systems for Providing a Bid Recommendation for a Partition Group

As described above, a data set including a plurality of offerings can be partitioned to create a plurality of partition groups including one or more offerings. Actions taken on a partition group can be applied to each of the offerings included in the partition group. As a result, a merchant or advertiser wishing to take an action on a subset of the plurality of offerings having one or more common attribute values can do so by taking actions on a partition group corresponding to the one or more corresponding attribute values.

In some implementations, merchants can create one or more content placement campaigns by hierarchically partitioning a data set including a plurality of offerings. The merchant can participate in auctions for displaying content related to the offerings included in the content placement campaign. The content related to the offerings can be provided for display at user computing devices in response to receiving a request for content. In some implementations, the content can be an advertisement. In some such implementations, the content can include information associated with a particular offering included in the content placement campaign.

In some implementations, the content placement campaign can be an advertising campaign. In some such implementations, the advertising campaign can include a plurality of product offerings hierarchically partitioned into a plurality of partition groups. The advertising campaign can be managed by an advertiser and can be configured such that when an auction to display content related to one of the offerings takes place, a bid value corresponding to a bid value of the partition group to which the offering belongs is bid. The bid value of the partition group can be assigned by the advertiser. In some implementations, the bid value of the partition group can be recommended to the advertiser. In some implementations, the bid value of the partition group can be determined to meet one or more goals of the advertiser. In some implementations, the bid value of the partition group can be based on historical auction related data of auctions in which the offering or other offerings similar to the offering included in the partition group participated.

To optimize the performance of content placement campaigns, merchants or advertisers are constantly seeking for new ways to determine the appropriate bid values to bid on auctions. An important consideration that affects the performance of a content placement campaign is the bid value a merchant is placing in an auction. If the merchant consistently bids a bid value that is too high, the merchant may win almost every auction but may be overpaying and may receive more impressions than desired, adversely affecting the click through rate of the content selected for display. If the merchant bids a bid value that is too low, the merchant may not win enough auctions and not receive the desired number of impressions.

The present disclosure provides methods and systems for providing one or more bid recommendations for partition groups of a content placement campaign that include one or more offerings. The methods and systems described herein can identify, from historical auction related data, bid values that can optimize the performance of the content placement campaign.

It should be appreciated that the methods and systems described herein can be employed in conjunction with the methods and systems for hierarchically partitioning a data set including a plurality of offerings to create partition groups that can optimize the performance of a content placement campaign based on the data set. As such, the partition hierarchy module 120 of the data processing system 110 shown in FIG. 1A can be configured to identify one or more goals related to optimizing the performance of a content placement campaign created upon partitioning the plurality of offerings of the data set into a plurality of partition groups.

In brief overview, the methods and systems for providing one or more bid recommendations for partition groups of a content placement campaign are described. The data processing system can identify, for a partition group for which a bid recommendation is to be provided, one or more offerings included in the partition group. The data processing system can identify auction related data associated with auctions in which the offerings in the partition group participated or would likely have participated. The data processing system can determine, from the auction related data, for each offering, an average bid value to achieve a performance metric goal of the partition group. The data processing system can compute, from the determined average bid values for each of the offerings, a bid recommendation for the partition group and provide the computed bid recommendation for the partition group for display.

Figure 4A:
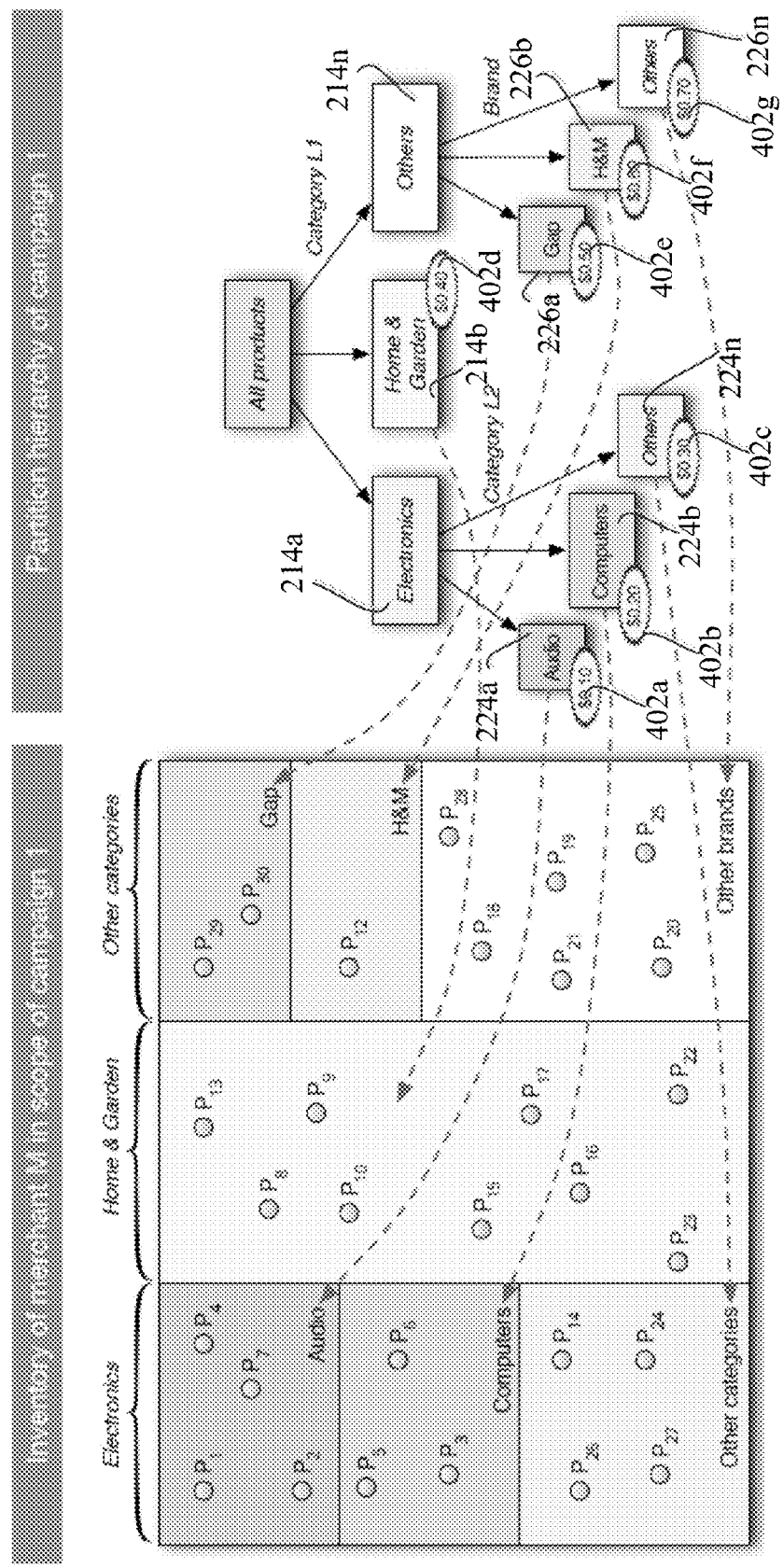
FIGS. 4A-4B are block diagrams representing bid values assigned to a plurality of partition groups including the plurality of offerings.
Figure 4B:
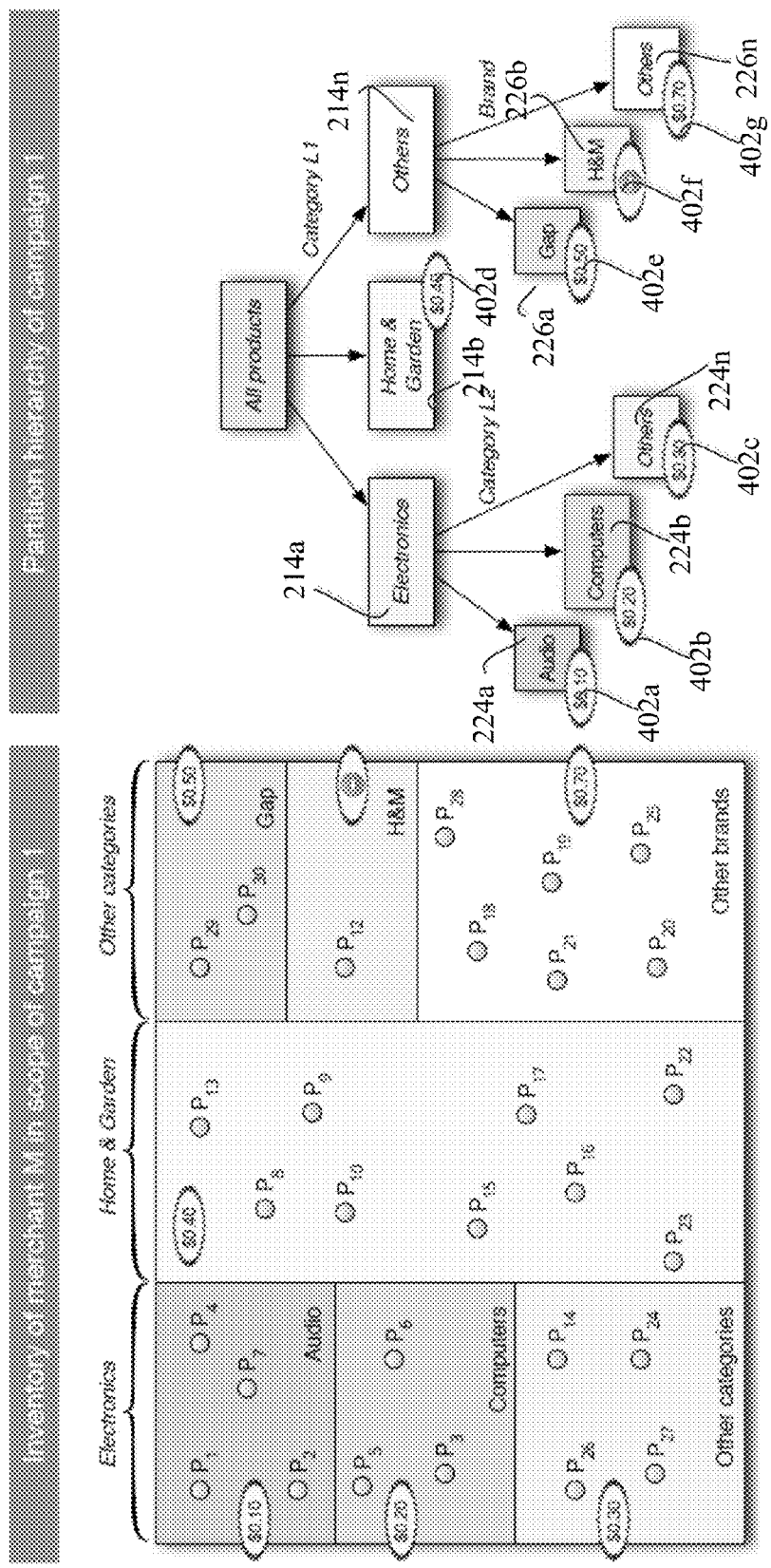

FIGS. 4A-4B are block diagrams representing bid values assigned to a plurality of partition groups including the plurality of offerings. Referring briefly to FIG. 4A, each of the partition groups 222a, 22b, 222n, 214b, 226a, 226b, 226n are assigned bid values 402a-402f (collectively, bid values 402). In particular, partition group "Audio" 222a is assigned a bid value 402a of $0.10, partition group "Computers" 222b is assigned a bid value 402b of $0.20, partition group "Others" 222n is assigned a bid value 402c of $0.30, partition group "Home & Garden" 214b is assigned a bid value 402d of $0.40, partition group "Gap" 226a is assigned a bid value 402e of $0.50, partition group "H&M" 226b is assigned a bid value 402f of $0.60 and partition group "Others" 226n is assigned a bid value 402f of $0.70. The partition groups Electronics 212a and Others 212n are not assigned bid values as the offerings included in each of these partition groups are also included in more specific partition groups, namely the partition groups 222a-222n and 226a-226n. As shown in FIG. 4A, the bid value assigned to the respective partition group corresponds to the bid amount the merchant associated with the content placement campaign will likely bid when participating in an auction to display content associated with an offering included in the respective partition group. As such, the merchant will likely bid $0.10 for all auctions related to any of the offerings included in the partition group "Audio" 222a. Similarly, the merchant will likely bid $0.40 for all auctions related to any of the offerings included in the partition group "Home & Garden" 214b, and so forth.

In some implementations, the bid values 402 shown in FIG. 4A can be determined by a bid recommendation module 125. Referring back to FIG. 1A, the bid recommendation module 125 can be designed, constructed or configured to calculate one or more bid values for one or more partition groups of a content placement campaign, or more specifically, a hierarchically partitioned content placement campaign as shown in FIG. 5A. In some implementations, the bid recommendation module 125 can be configured to recommend bid values to the merchant, which the merchant can use to establish bid values for or assign bid values to each of the partition groups in the content placement campaign.

In some implementations, the bid recommendation module 125 can receive a request to provide a bid recommendation. In some implementations, the bid recommendation module 125 can receive a request to provide a bid recommendation for a particular partition group of a content placement campaign. In some implementations, the bid recommendation module 125 can receive a request to provide bid recommendations for each of the partition groups of the content placement campaign. In some implementations, the bid recommendation module 125 can receive the request for a bid recommendation from a merchant associated with the content placement campaign. In some implementations, the bid recommendation module 125 can receive the request from the bid hierarchy module 120 responsive to receiving a request to hierarchically partition a data set.

Responsive to the request, the bid recommendation module 125 can be configured to initiate the process for determining a bid value to recommend for the identified partition group. In some implementations, the request can include one or more goals corresponding to which the bid value of the bid recommendation should be determined. In some implementations, the goals can be specific to one or more of the content placement campaign, one or more partition groups, or the partition group for which the bid recommendation is requested. In some implementations, the bid recommendation module 125 can automatically initiate the process of providing a bid recommendation without even receiving a request for a bid recommendation. In some implementations, the bid recommendation module 125 can be configured to initiate the process of providing a bid recommendation in response to a request to hierarchically partition a data set including a plurality of offerings.

The bid recommendation module 125 can be configured to identify one or more offerings included in a partition group for which a bid recommendation is to be provided. In some implementations in which the bid recommendation module 125 is requested to provide bid recommendations for more than one partition group, the bid recommendation module 125 can identify bid recommendations for each of the partition groups individually. In some implementations, the bid recommendation module 125 can be configured to identify each of the offerings included in the partition group for which the bid recommendation is to be provided. The offerings can be products, services, or any other entity for which an content placement campaign can be generated. In some implementations, the offerings can correspond to the offerings 126 described above with respect to Section A.

The bid recommendation module 125 can be configured to identify auction related data of auctions in which the offerings in the partition group participated or would likely have participated. In some implementations, the bid recommendation module 125 can be configured to identify, for each offering in the partition group, auction related data of auctions in which the offering participated or would likely have participated. In some implementations, the bid recommendation module 125 can be configured to identify auction related data of auctions in which the offering would likely have participated had the content placement campaign in which the offering was included been active or live.

In some implementations, the bid recommendation module 125 can identify auctions in which an offering in the partition group participated by performing a lookup in an auction log for entries that identify the merchant associated with the offering in the partition group and the offering itself. In some implementations, to identify auctions in which an offering in the partition group would likely have participated, the bid recommendation module 125 can be configured to identify auctions in which offerings that match the offering in the partition group did participate. Offerings that match the offering in the partition group correspond to products or services that can be identical to the offering in the partition group.

In some implementations, the bid recommendation module 125 can be configured to identify, for each offerings, auctions in which the offering included in the partition group participated or would have participated. To do so, the bid recommendation module 125 can identify, for each offering, a universal identifier corresponding to the offering. The bid recommendation module 125 can then identify, based on the universal identifier corresponding to the offering, auctions associated with the universal identifier from an auction log. In some implementations, the bid recommendation module can limit the search for auctions in the auction log to a predetermined time period. The bid recommendation module 125 can then select one or more of the identified auctions according to a filtering criteria that corresponds to a bidding policy associated with the offering in the partition group. The bidding policy of the offering can include one or more rules according to which bids are placed. For example, the bidding policy can include restricting bids to be placed only on content placement opportunities corresponding to requests from a particular geographic region, for example, the U.S. In some implementations, the bidding policy can include restricting bids from being placed on content placement opportunities corresponding to requests from a particular type of device, for example, mobile devices, such as cell phones and tablets. In some implementations, the bidding policy can be based on one or more bidding strategies.

In some implementations, to identify auctions in which an offering in the partition group would likely have participated, the bid recommendation module 125 can identify auctions in which any merchant or advertiser placed a bid for the same offering as the offering included in the partition group. In some implementations, the bid recommendation module 125 can identify a category identifier associated with the offering. For example, if the offering is a Samsung Galaxy S3 mobile phone, the bid recommendation module 125 can identify a catalog identifier associated with the catalog specific to the offering that may be universal across multiple merchants. In some implementations, the catalog identifier can be assigned by the data processing system 110. The bid recommendation module can identify a catalog identifier for the offering by performing a lookup in a table that includes a list of catalog identifiers and corresponding descriptions, titles and other product identifier information associated with the offering. The category identifiers can be used to search for auctions in which offerings that are identical to the offering included in the partition group participated.

In some implementations, the bid recommendation module 125 can then select a subset of the identified auctions according to a filtering criteria. The filtering criteria can be based on whether a merchant or advertiser of an auction included in the subset of identified auctions is a competitor of the merchant associated with the offering in the partition group to which the bid recommendation is being provided. Other filtering criteria can include geographic limitations, language limitations, amongst others. By using the filtering criteria to select a subset of the identified auctions, the bid recommendation module 125 can identify those auctions in which the merchant associated with the offering in the partition group would likely have participated. Upon identifying such auctions in which the merchant associated with the offering in the partition group participated or would likely have participated, the bid recommendation module 125 can identify auction related data from such auctions to determine a bid value to recommend for that particular offering.

The bid recommendation module 125 can be configured to identify advertiser auction log entries over a predetermined period of time that included the category identifier corresponding to the offering in the partition group. The predetermined period of time can vary based on the offering itself. Some offerings are more obscure, therefore generating a fewer number of auctions within a predetermined period of time in contrast with a more popular offering. As such, based on the popularity of the offering, the type of offering, amongst others, the predetermined period of time can vary anywhere from 1 day to 1 year. In some implementations, the predetermined period of time can be anywhere from 7 to 14 days.

In some implementations, the bid recommendation module 125 can be configured to first identify auction related data of auctions in which a first of the offerings in the partition group participated or would likely have participated. The bid recommendation module 125 can then recursively identify auction related data of auctions in which each of the other offerings in the partition group participated or would likely have participated.

The bid recommendation module 125 can use historical auction related data to determine a bid value to recommend. The historical auction related data, however, may not include any auctions in which the offering associated with the merchant has participated. This is particularly true for a new merchant creating their first content placement campaign. However, the bid recommendation module 125 can take advantage of auction related data of other offerings associated with other merchants that match or are identical to the offering associated with the merchant to determine bid values as bid recommendations.

A general overview of the auction process and auction log entries is described herein. In some implementations, auctions for content placement rely on both quality scores and bid values. In some implementations, an advertising auction system can be configured to conduct an auction each time an opportunity to serve content arises. In some implementations, the advertising auction system can be a part of the data processing system 110. In some implementations, the advertising auction system can be a part of the bid recommendation module 125. In some implementations, the advertising auction system can be separate from the data processing system 110 but may be configured to communicate with the data processing system 110 via the network 105.

In some implementations, the advertising auction system can be configured to conduct an auction in response to receiving a request for content. The request can be a search query, a query to purchase an product or service, a request for information relating to a product or service, amongst others. Upon receiving the request, the advertising auction system can identify all content items that match the request for content. In some implementations, the match can be based on a keyword match. From the set of matching content items, the advertising auction system can filter one or more of the content items that may not be eligible for participation in the auction. The advertising auction system can use geographic filters, type of device filters, amongst others to filter out content items that are not eligible based on geographic, type of device or other content selection criteria. From the filtered set, the content items are ranked based on a quality score corresponding to the quality of the content item relative to the search request. Various factors can affect the quality of the content item, including the accuracy of the match between the content item and the request, the source of the content (the advertiser or merchant), the reputation of the website to which the content item is linked, amongst others.

The advertising auction system can then select a predetermined number of highest ranked content items to participate in the auction process. Each of the content items are associated with a bid value, which can be the amount of money an advertiser is willing to pay in the event the content item is selected for display responsive to the request. The bid value can be the maximum cost per click (CPC), which represents the maximum amount of money an advertiser is willing to pay in the event the content item generates a click through. In some other implementations, the bid value can be the cost per thousand impressions (CPM), which represents the maximum amount of money an advertiser is willing to pay for a thousand impressions. In some other implementations, the bids may be based on a percentage of the price of the offering. For instance, in one approach, an advertiser can bid according to a conversion-based bidding strategy in which an advertiser is willing to pay up to a predefined percentage of the price of the associated conversion. In some implementations, advertisers may be able to bid on the return on advertising spend (ROAS) for a product or a product partition. In some implementations, the advertising auction system can then select the content items associated with the highest bids as the winning content items. In this way, both the quality of the content item relative to the request to receive content from a user and the bid value can affect a content item's chances of being selected for display.

The advertising auction system can be configured to maintain an advertising auction log of all auctions that take place. In some implementations, the advertising auction system can be configured to log, for every auction, information identifying all of the participants of the auction, for example, offerings of merchants, together with potential bids that the merchant would have to place to place the ad in each of the one or more winning ad positions. FIG. 5 shows a portion of an advertising auction log. The advertising auction log 500 can be stored in a content repository that is accessible by bid recommendation module 125. In some implementations, the bid recommendation module 125 can be configured to access the advertising auction log 500. In some implementations, the database 140 can include the advertising auction log 500. In some implementations, the advertising auction log can include entries for every auction that takes place. Each entry can include an Auction ID 502 uniquely identifying the auction. In addition, the entry 502 of the auction log 500 can identify one or more keywords 508a-n or search terms based on which the content items are matched. Each entry 502 can also identify a catalog identifier 510, which is a unique identifier assigned by the advertising auction system to a particular product or service. The entry 502 can also include one or more product identifiers 512 that correspond to an identifier issued to the product or service by the advertiser. The entry can also include one or more bid values 514a-n corresponding to the bids placed by each of the participants of the auction, one or more winning bids 516a-n corresponding to the winning bids, a winning bid position 518 corresponding to the position of the content item, and a participant identifier 520a-n identifying the participant of the auction. In some implementations, the advertising auction system can further be configured to store bid difference values 522a-n corresponding to the difference between a participant's bid and each of the winning bids. By calculating this difference at the time of logging the auction data, the bid recommendation module 125 can be configured to utilize the difference between a merchant's bid and the winning bid values to determine bid recommendations without additional processing. The auction log 500 can store additional information associated with each auction, including but not limited to geographic region, language, date and time of day, amongst others.

Once the bid recommendation module 125 has identified auction related data for an offering included in the partition group for which to determine a bid recommendation, the bid recommendation module 125 can then determine the average bid for the offering from the identified entries. In some implementations, the bid recommendation module 125 can determine the average winning bid for the offering. In some implementations, the bid recommendation module 125 can determine the average winning bid for each winning position. In some implementations, the bid recommendation module 125 can determine the lowest bid value that would have been sufficient to win the auction.

In some implementations, the bid recommendation module 125 can determine other information based on one or more goals identified by the merchant. These goals may be specific to the partition group or specific to the content placement campaign. In some implementations, the goal can be a performance metric goal of the partition group or the content placement campaign. The performance metric goals can include one or more of a predetermined impression share for offerings included in the partition group, a predetermined click-through rate for offerings included in the partition group, and a predetermined impression share of the offerings included in the partition at one or more content placement positions. An example of a performance metric goal of the partition group can be to achieve an impression share of 50%. Another example of a performance metric goal of the partition group can be to have a click-through rate of 4%.

In some implementations, the bid recommendation module 125 can be configured to determine, from the auction related data, for each offering, an average bid value to achieve a performance metric goal of the partition group. In some implementations, the bid recommendation module 125 can be configured to determine an average bid value for each offering that will result in a performance metric goal for the particular offering that matches the performance metric goal of the partition group. For example, to achieve an impression share of 50% for the partition group, the bid recommendation module 125 can determine an average bid value for each offering that will result in an impression share of 50% for the particular offering.

The bid recommendation module 125 can compute, from the determined average bid values for each of the offerings, a bid recommendation for the partition group. In some implementations, the bid recommendation module 125 can compute the bid recommendation for the partition group by adding the average bid values for each of the offerings and dividing the sum by the total number of offerings. This may result in providing an accurate bid recommendation in some implementations in which the number of impressions for content items related to each of the offerings over a given period of time is about equal.

In some implementations in which the popularity of one or more offerings in the partition group is different from other offerings within the same partition group, the bid recommendation module may apply a weighting scheme to accommodate for the difference in popularity. In some implementations, the bid recommendation module 125 can determine, for each offering, a number of auctions in which the offering participated or would likely have participated over a predetermined time period. The bid recommendation module can then assign a weight to each of the average bid values for each of the offerings based on the determined number of auctions in which the offering participated or would likely have participated. In some implementations, the weight can correspond to the popularity of the offerings. The bid recommendation module 125 can then compute the bid recommendation for the partition group based on the determined average bid values for each of the offerings and the weight assigned to each of the average bid values for each of the offerings.

In some implementations, the bid recommendation module 125 can determine a total number of impressions for content items related to each of the offerings over a given period of time. The bid recommendation module 125 can then calculate the product of the total number of impressions and the average bid value for each offering that will result in a performance metric goal matching for the particular offering that matches the performance metric goal of the partition group. The bid recommendation module 125 can then calculate the sum of the product of the total number of impressions and the average bid value for each offering and divide the sum by the total number of impressions across all offerings in the partition group to compute the average bid value for the partition group.

The bid recommendation module 125 can provide for display, the computed average bid value for the partition group as a bid recommendation to achieve the goals of the partition group. In some implementations, the bid recommendation module 125 can provide the computed average bid value for the partition group in response to the request from the merchant.

In some implementations, the bid recommendation module 125 can be configured to determine, from a desired impression share using the auction related data, bid values for each of the partition groups to achieve the desired impression share.

Figure 6A:
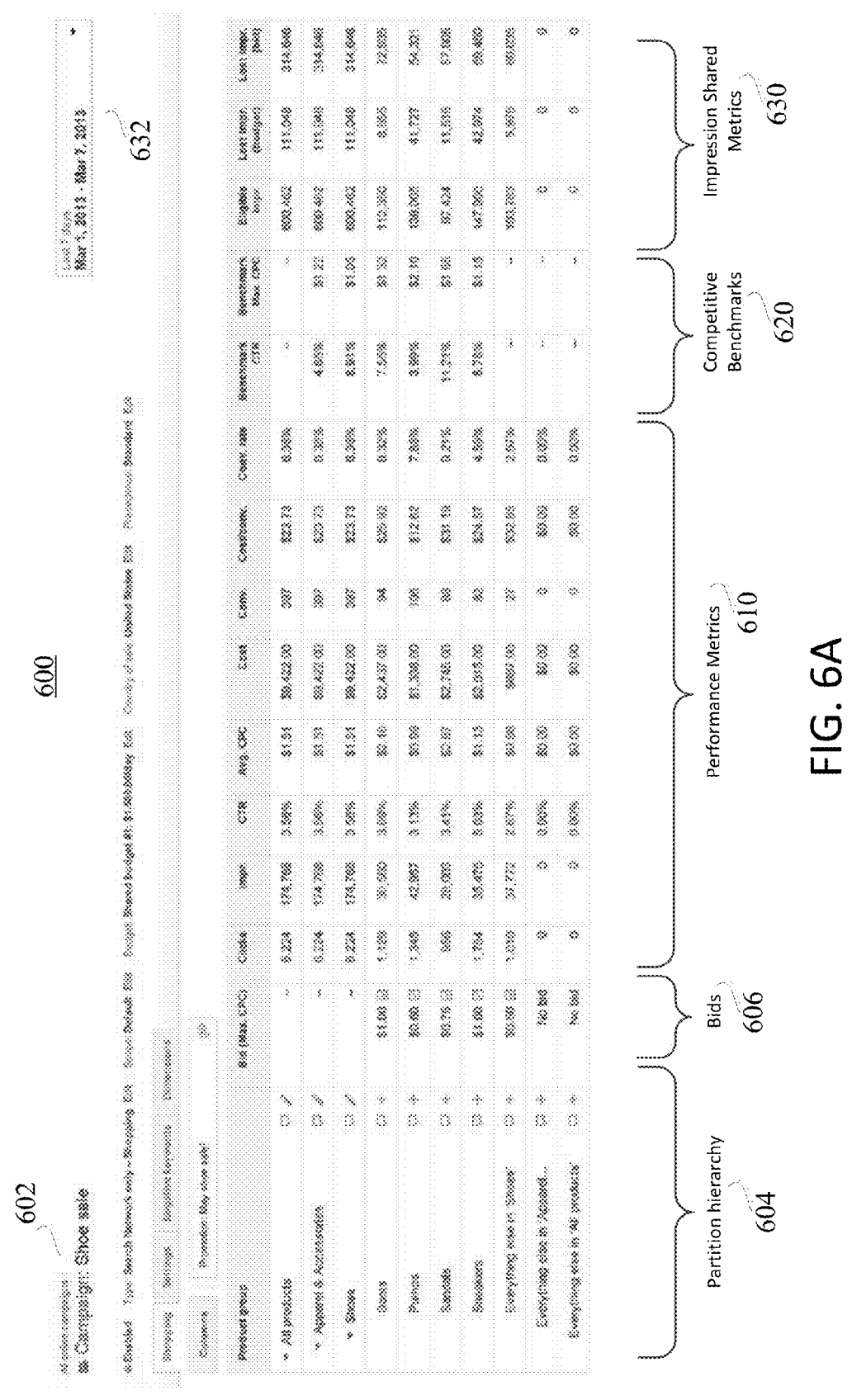
Figure 6B:
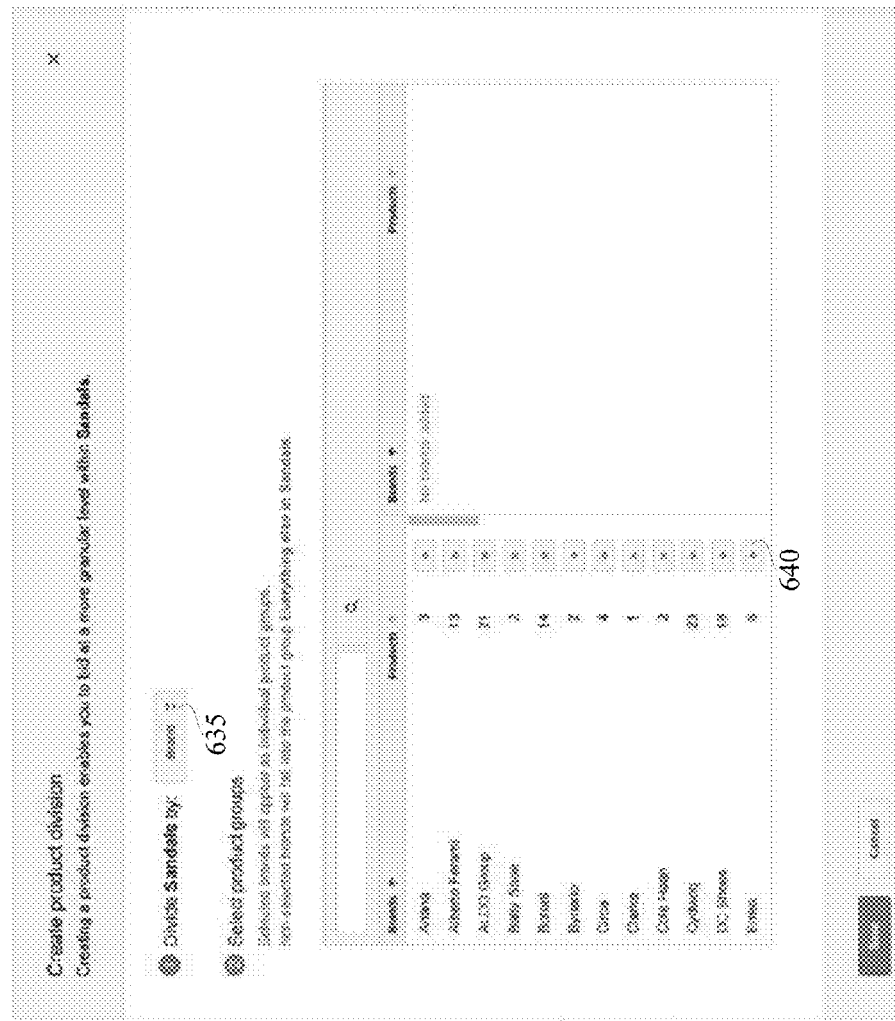
Figure 6C:
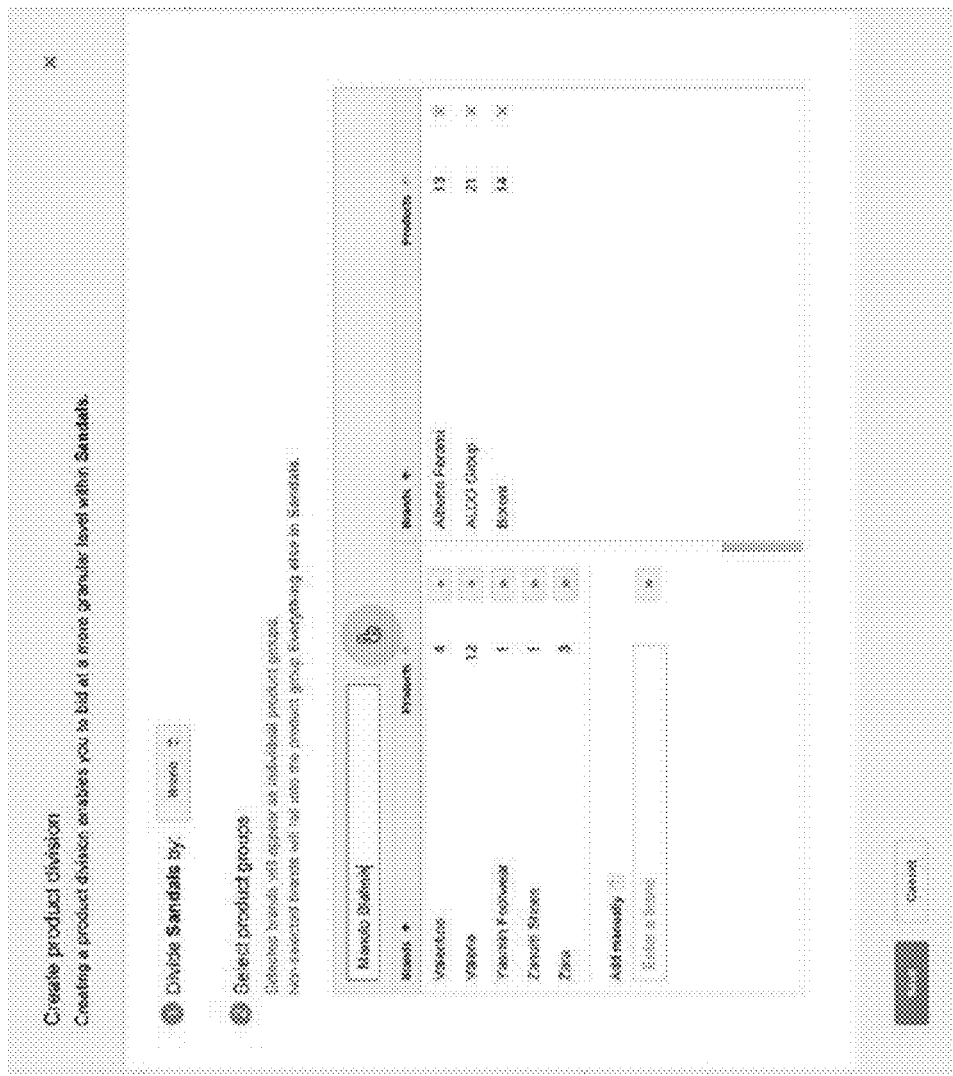

FIGS. 6A-6C are screenshots of a user interface 600 through which a user can manage a content placement campaign. As shown in FIG. 6A; the content placement campaign has a name "Shoe Sale". The content placement campaign 602 corresponds to a partition hierarchy 604, which includes "All Products" as the root node and was partitioned by category into two separate partition groups based on the attribute values "Apparel and Accessories" and "Everything else in All Products." The partition group "Apparel and Accessories" was further partitioned into two separate partition groups based on attribute values "Shoes" and "Everything else in Apparel and Accessories." The partition group "Shoes" was further partitioned into five separate partition groups, namely, "Boots," "Pumps," "Sandals," "Sneakers," and "Everything else in Shoes."

The user interface 600 further shows additional information associated with the partition groups of the partition hierarchy 602. The user interface 600 shows a corresponding bid value 604 for each partition group. The bid value is the maximum amount of money the campaign owner is willing to pay in the event a content item corresponding to an offering in the partition group generates a click-through. The user interface 600 shows corresponding performance metrics 610 for each partition group. The performance metrics includes a total number of clicks, a total number of impressions, a click through rate, an average cost per click, a cost representing the amount of money spent on the partition group, the number of conversions, the cost per conversion and the conversion rate. The user interface 600 also shows corresponding competitive benchmarks 620 for each partition group. The competitive benchmarks 620 can include a benchmark click through rate and a benchmark maximum cost per click or bid value. In some implementations, competitors can be identified as all advertisers participating in the auctions for the particular partition group. In some implementations, competitors can be identified as all advertisers of similar size participating in the auctions for the particular partition group. In some implementations, competitors can be identified as all of the top advertisers participating in the auctions for the particular partition group. For example, the top 5 advertisers.

The user interface 600 also shows impression shared metrics 630 for each partition group. The impression shared metrics 630 include a total number of eligible impressions, the number of lost impressions due to budget and the number of lost impressions due to low bids. The user interface can show data corresponding to auctions taken place within a time frame 632 identified on the user interface 600.

FIG. 6B shows a screenshot to create an additional hierarchical layer of subdivision. The campaign owner of the campaign 602 can further subdivide the partition group "Sandals" by one or more candidate offering attributes. As shown in FIG. 6B, the campaign owner can subdivide the partition group "Sandals" by the candidate offering attribute "Brand." To subdivide the partition group "Sandals" by another candidate offering attribute, the campaign owner can select the drop down menu via the icon 635. In doing so, a list of all the offerings broken up by Brand is shown in the drop down menu. To select any of the Brands to create a partition group, the campaign owner can select one of the icons 640. FIG. 6C shows a screenshot in which the campaign owner can manually enter a brand name to create a partition group corresponding to the brand name.

Figure 7:
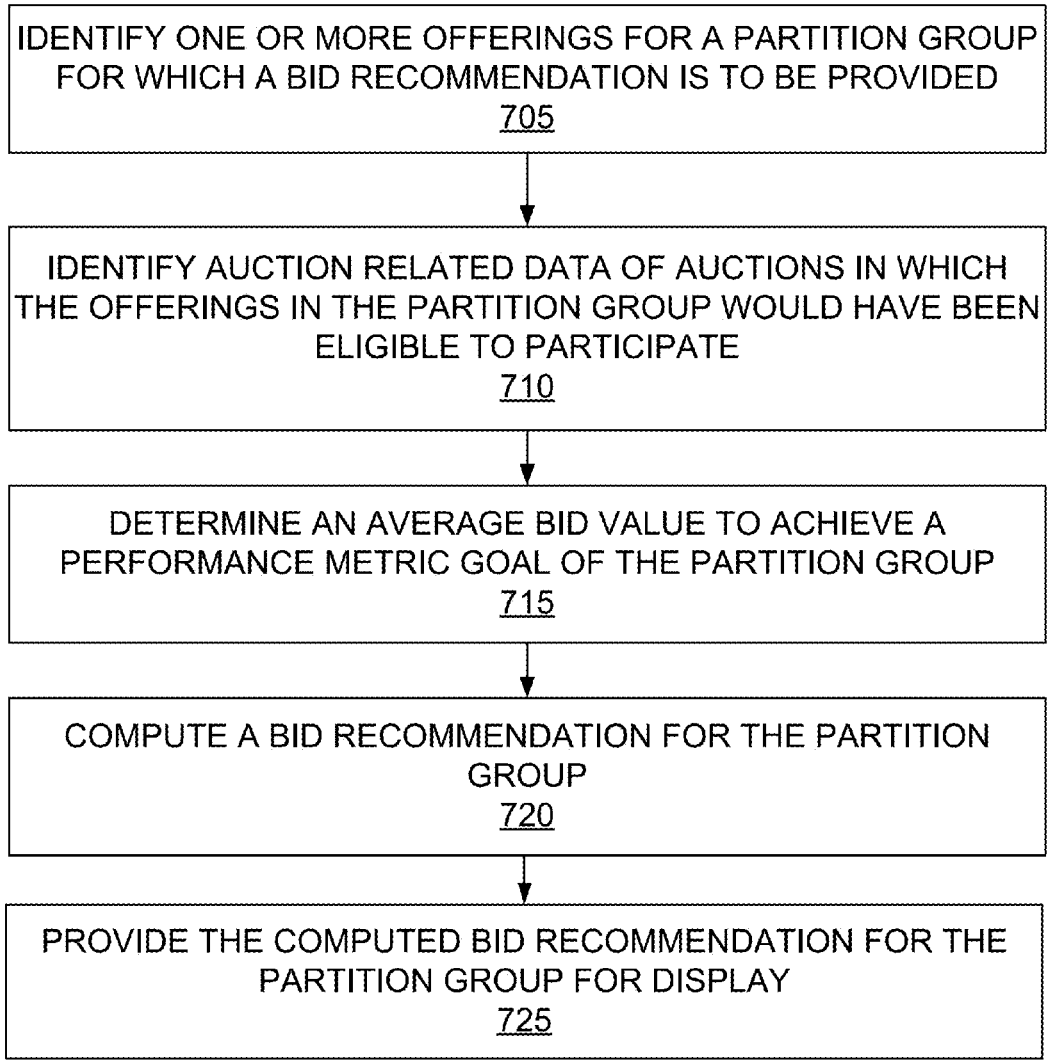
FIG. 7 is a flow diagram depicting one implementation of the steps taken to provide a bid recommendation for a group of offerings.

FIG. 7 is a flow diagram depicting one implementation of the steps taken to provide a bid recommendation for a group of offerings. In particular, FIG. 7 illustrates a flow diagram depicting a method 700 for providing a bid recommendation for a group of offerings. In brief overview, the bid recommendation module can identify, for a partition group for which a bid recommendation is to be provided, one or more offerings included in the partition group (BLOCK 705). The bid recommendation module can identify auction related data associated with auctions in which the offerings in the partition group participated or would likely have participated (BLOCK 710). The bid recommendation module can determine, from the auction related data, for each offering, an average bid value to achieve a performance metric goal of the offering (BLOCK 715). The bid recommendation module can compute, from the determined average bid values for each of the offerings, a bid recommendation for the partition group (BLOCK 720) and provide the computed bid recommendation for the partition group for display (BLOCK 725).

In further detail, the bid recommendation module can identify, for a partition group for which a bid recommendation is to be provided, one or more offerings included in the partition group (BLOCK 705). The partition group can be created responsive to a request to hierarchically partition a plurality of offerings. The offerings can be products, services, or any other entity for which an content placement campaign can be generated. In some implementations, the offerings can correspond to the offerings 126 described above with respect to Section A.

The bid recommendation module can identify auction related data associated with auctions in which the offerings in the partition group participated or would likely have participated (BLOCK 710). In some implementations, the bid recommendation module can identify auction related data of auctions in which the offering would likely have participated had the content placement campaign in which the offering was included been active or live. In some implementations, the bid recommendation module can identify auctions in which an offering in the partition group participated by performing a lookup in an auction log for entries that identify the merchant associated with the offering in the partition group and the offering itself. In some implementations, to identify auctions in which an offering in the partition group would likely have participated, the bid recommendation module can be configured to identify auctions in which offerings that match the offering in the partition group did participate. Offerings that match the offering in the partition group correspond to products or services that can be identical to the offering in the partition group.

To identify auctions in which an offering in the partition group would likely have participated, the bid recommendation module can identify auctions in which any merchant or advertiser placed a bid for the same offering as the offering included in the partition group. In some implementations, the bid recommendation module can identify a category identifier associated with the offering. In some implementations, the catalog identifier can be assigned by the data processing system. The bid recommendation module can identify a catalog identifier for the offering by performing a lookup in a table that includes a list of catalog identifiers and corresponding descriptions, titles and other product identifier information associated with the offering. The category identifiers can be used to search for auctions in which offerings that are identical to the offering included in the partition group participated. In some implementations, the bid recommendation module 125 can identify auctions in which any merchant or advertiser placed a bid for the same offering as the offering included in the partition group.

In some implementations, the bid recommendation module 125 can then select a subset of the identified auctions according to a filtering criteria. The filtering criteria can be based on whether a merchant or advertiser of an auction included in the subset of identified auctions is a competitor of the merchant associated with the offering in the partition group to which the bid recommendation is being provided. The filtering criteria can also include geographic limitations, language limitations, amongst others. By using the filtering criteria to select a subset of the identified auctions, the bid recommendation module can identify those auctions in which the merchant associated with the offering in the partition group would likely have participated. Upon identifying such auctions in which the merchant associated with the offering in the partition group participated or would likely have participated, the bid recommendation module can identify auction related data from such auctions to determine a bid value to recommend for that particular offering.

The bid recommendation module can identify advertiser auction log entries over a predetermined period of time that include the category identifier corresponding to the offering in the partition group. The predetermined period of time can vary based on the offering itself. Some offerings are more obscure, therefore generating a fewer number of auctions within a predetermined period of time in contrast with a more popular offering. As such, based on the popularity of the offering, the type of offering, amongst others, the predetermined period of time can vary anywhere from 1 day to 1 year. In some implementations, the predetermined period of time can be anywhere from 7 to 14 days.

In some implementations, the bid recommendation module can first identify auction related data of auctions in which a first of the offerings in the partition group participated or would likely have participated. The bid recommendation module can then recursively identify auction related data of auctions in which each of the other offerings in the partition group participated or would likely have participated.

The bid recommendation module can determine, from the auction related data, for each offering, an average bid value to achieve a performance metric goal of the offering (BLOCK 715). In some implementations, once the bid recommendation module 125 has identified auction related data for an offering included in the partition group for which to determine a bid recommendation, the bid recommendation module 125 can then determine the average bid for the offering from the identified entries. In some implementations, the bid recommendation module 125 can determine the average winning bid for the offering. In some implementations, the bid recommendation module 125 can determine the average winning bid for each winning position. In some implementations, the bid recommendation module 125 can determine the lowest bid value that would have been sufficient to win the auction.

In some implementations, the bid recommendation module can determine other information based on one or more goals identified by the merchant. These goals may be specific to the partition group or specific to the content placement campaign. In some implementations, the goal can be a performance metric goal of the partition group or the content placement campaign. An example of a performance metric goal of the partition group can be to achieve an impression share of 50%. Another example of a performance metric goal of the partition group can be to have a click-through rate of 4%.

In some implementations, the bid recommendation module can determine, from the auction related data, for each offering, an average bid value to achieve a performance metric goal of the partition group. In some implementations, the bid recommendation module can determine an average bid value for each offering that will result in a performance metric goal for the particular offering that matches the performance metric goal of the partition group. For example, to achieve an impression share of 50% for the partition group, the bid recommendation module 125 can determine an average bid value for each offering that will result in an impression share of 50% for the particular offering.

The bid recommendation module can compute, from the determined average bid values for each of the offerings, a bid recommendation for the partition group (BLOCK 720). In some implementations, the bid recommendation module can compute the bid recommendation for the partition group by simply adding the average bid values for each of the offerings and dividing the sum by the total number of offerings. This may result in providing an accurate bid recommendation in some implementations in which the number of impressions for content items related to each of the offerings over a given period of time is about equal. In some implementations, the bid recommendation module can determine a total number of impressions for content items related to each of the offerings over a given period of time. The bid recommendation module can then calculate the product of the total number of impressions and the average bid value for each offering that will result in a performance metric goal matching for the particular offering that matches the performance metric goal of the partition group. The bid recommendation module can then calculate the sum of the product of the total number of impressions and the average bid value for each offering and divide the sum by the total number of impressions across all offerings in the partition group to compute the average bid value for the partition group.

The bid recommendation module can provide the computed bid recommendation for the partition group for display (BLOCK 725). In some implementations, the bid recommendation module 125 can provide the computed average bid value for the partition group in response to the request from the merchant.

C. Methods and Systems for Providing a Modified Bid in an Auction

The present disclosure provides methods and systems for providing a modified bid. In particular, the present disclosure provides methods and systems for providing a modified bid in an auction. The modified bid can be established and used to provide a merchant or advertiser additional flexibility in managing a content placement campaign. In some implementations, the modified bids can be based on bid modifiers. The bid modifiers can be used to provide differentiation within offerings included within a single partition group. A bid modifier can be configured to modify a base bid value of an offering in the partition group such that the modified bid is different from the base bid value associated with the partition group to which the offering belongs. In some implementations, the bid modifiers and corresponding modified bids can be utilized in accordance with a bid modification policy. The bid modification policy can be based on one or more attributes of the products.

In some implementations, merchants can create multiple content placement campaigns to enable bid modification. The multiple content placement campaigns can include a primary or base content placement campaign and one or more supplemental content placement campaigns that enable bid modification. The base and supplemental content placement campaigns can include one or more of the same offerings. In some implementations, these offerings can be included in partition groups in each of the base and supplemental content placement campaigns. The partition group of the base content placement campaign and each of the supplemental content placement campaigns that be based on one or more of different candidate entity attributes, different attribute values of the same candidate entity attributes or different combinations of candidate entity attributes and attribute values. A first partition group corresponding to a base content placement campaign can be assigned a first bid value, while a second partition group including the same offering corresponding to a supplemental content placement campaign can be assigned a second bid value. As such, the bid values corresponding to the same offering in the base and the supplemental content placement campaigns can be different. In some implementations, the bid modifiers can be utilized to cross-cut an existing partition hierarchy. In this way, the bid modifiers can be used to introduce an orthogonal mechanism to vary bids within partition groups, for example, when dealing with multiple campaigns having different campaign priority levels.

In some implementations, for any given content placement opportunity, all bids for the offering are identified across multiple content placement campaigns of the merchant and the highest bid is selected. In some other implementations, the advertiser can assign a priority level to each of the content placement campaigns, for example, the base and supplemental content placement campaigns. In some such implementations, for any given content placement opportunity, the bid associated with the content placement campaign having the higher priority level is used for placing the bid.

One use of multiple content placement campaigns is to provide bid discrimination between offerings included in the same partition group. An example of such a use is described herein. An advertiser creates a campaign structured by Product Category with a number of Product Groups covering the advertiser's full inventory. However, the advertiser wishes to have a number of specific products for which the advertiser desires to control the exact bid. For these products, the advertiser can create another campaign of higher priority divided by Product ID and sets the bids of the particular products to the desired specific bid values. These bids will be used for these products irrespective of what the first campaign would give.

Another use of the multiple content placement campaigns is to exclude one or more offerings included in partition group from participating in an auction. An example of such a use is described herein. An advertiser creates a campaign structured by Product Category with a number of Product Groups covering the advertiser's full inventory. However, the advertiser does not want to bid for Apple products. For these products, the advertise can create another campaign having a higher campaign priority level that is structured by Brand. The advertiser can set the Product Group Apple as excluded. In this way, Apple products will not be advertised because the higher priority campaign takes precedence, irrespective of what the first campaign would give.

The use of multiple content placement campaigns can extend outside the realm of bidding for auctions. In some implementations, an advertiser can use multiple content placement campaigns for reporting purposes. By creating multiple content placement campaigns structured according to different candidate offering attributes, the partition groups can include different sets of offerings. The advertiser, via a user interface, such as the user interface shown in FIG. 6A, can view performance metrics according to the different partition groups. In this way, the advertiser can identify trends through an evaluation of the performance metrics across multiple content placement campaigns and develop a strategy to optimize bid placement in auctions.

It should be appreciated that the methods and systems described herein can be employed in conjunction with the methods and systems for hierarchically partitioning a data set including a plurality of offerings to create partition groups that can optimize the performance of a content placement campaign based on the data set. In addition, the methods and systems described herein can be employed in conjunction with the methods and systems for providing bid recommendations.

Referring back to FIG. 1A, the data processing system includes a bid modification module 130. The bid modification module 130 can be designed, constructed or configured to provide a modified bid in an auction. In some implementations, the bid modification module 130 can provide a modified bid in accordance with a bid modification policy. The bid modification policy can include one or more rules or conditions according to which modified bids are to be provided. In some implementations, the bid modification module 130 can compute a modified bid by applying a bid modifier to a base bid value according to one or more rules of the bid modification policy. In some implementations, the bid modification module 130 can select a modified bid value to provide according to one or more rules of the bid modification policy.

As described above, one of the advantages of establishing multiple content placement campaigns can be to provide bid discrimination amongst offerings included in a single partition group assigned a particular bid value. The partition hierarchy module 120 can be configured to create multiple content placement campaigns using the same or overlapping data set for an advertiser based on different partition criteria 127.

In some implementations, the bid modification module 130 can receive a request to modify bid values of one or more offerings included in a primary content placement campaign. In some implementations, the bid modification module 130 can receive the request from the merchant via a user interface. In some implementations, the request can specify a modified bid value. In some other implementations, the request can include a bid modifier which can be used to determine a modified bid value to provide in an auction. In some implementations, the request can include a request to modify a bid of an offering included in a partition group having a bid value assigned to each of the offerings included in the partition group. In some implementations, the request can include a request to modify a bid value associated with a plurality of offerings within a single partition group. In some implementations, the request can include a request to modify a bid value associated with a plurality of offerings included in a plurality of partition groups. In some implementations, the request can include a request to modify the bid value of all offerings corresponding to a particular attribute value. In some such implementations, the request can include a request to modify the bid value of all offerings in a partition group corresponding to a particular attribute value different from the attribute value according to which the partition group was created. For example, the partition group can correspond to an attribute value "Nike" of an offering attribute "Brand." The request can include a request to modify the bid value of all products included in the partition group that correspond to an attribute value "T-shirts" of an offering attribute "Apparel." Upon successfully executing the request, all Nike T-shirts included in the partition group corresponding to the attribute value "Nike" can be associated with a modified bid value, while all other Nike products included in the partition group corresponding to the attribute value "Nike" continue to be associated with the original bid value assigned to the partition group.

In some implementations, the request can specify a bid modification policy according to which to modify the bid values. The bid modification policy can specify a modified bid value, a bid modifier value, one or more rules or conditions specifying parameters under which to modify the bid, amongst others. In some implementations, the parameters under which to modify the bid can be based on one or more of content selection criteria (for example, time of day, type of device, geographic regions). In some implementations, the parameters under which to modify the bid can be based on information associated with the offering that are specific to the merchant or advertiser. For instance, a parameter under which to modify the bid can be based on the inventory of a product (for example, if the inventory of the offering is greater than 100 units, apply an increased bid of $1.5). In some implementations, the parameters under which to modify the bid can be based on external data, for example, news sources, website traffic related statistics, search query statistics, amongst others (for example, apply an increased bid of $2 if the product is trending on Twitter). In some implementations, the parameters under which to modify the bid can be based on one or more performance metrics of the offering (for example, provide an increased bid if the impression share for an offering is below a predetermined threshold or conversely, provide a decreased bid if the number of clicks is greater than 1000). In some implementations, the parameters under which to modify the bid can be based on a combination of conditions.

In some implementations, the bid modification policy can be provided by the advertiser. In some implementations, the advertiser can select the bid modification policy from a plurality of bid modification policies. In some implementations, the bid modification module 130 can be configured to establish one or more bid modification policies in response to identifying one or more goals of the advertiser. In some implementations, the advertiser may provide the goals to the bid modification module 130 or the data processing system 110. In some implementations, the bid modification module 130 can automatically identify one or more goals of the advertiser.

The bid modification module 130 can be configured to monitor one or more performance metrics associated with one or more offerings, partition groups and content placement campaigns. In some implementations, the bid modification module 130 can monitor auction related data of auctions in which the offerings have participated. In some implementations, the bid modification module 130 can monitor one or more performance metrics statistics, including but not limited to impression volume, click volume, impression share, click through rates, amongst others. In some implementations, the bid modification module 30 can identify trends relating to the performance of one or more offering attributes. In some implementations, the bid modification module 130 can determine that the impression share of a particular offering is decreasing or has decreased below a predetermined threshold. In some implementations, the bid modification module 130 can determine, from the identified trends or performance metrics statistics, a potential opportunity to modify the performance of the offerings for which the trend was identified. For example, based on determining that the impression share of an offering is decreasing or below a predetermined threshold, the bid modification module 130 can be configured to increase the bid value corresponding to the offering. In some implementations, the bid modification module 130 can determine the amount to increase the bid value to achieve a desired impression share by invoking the bid recommendation module 125 to determine an appropriate bid value.

As described herein, in some implementations, the bid modification can increase the bid value corresponding to the offering by establishing a modified bid for the offering. This can be done by creating a supplemental content placement campaign including a partition group that includes the offering and assigning the increased bid value to the partition group.

Alternatively, in some implementations, the bid modification module can create a rule to modify the bid value of the particular offering. The rule can be included in a library of rules, which the bid modification module can check each time a bid value is provided in an auction. In some implementations, the bid modification module can identify the offering for which a bid value is to be provided in an auction, perform a lookup in the library of rules to see if any rules for the offering exist, and then provide a bid value in accordance with the identified rule. If no rules exist for that offering, the bid modification module can provide the bid value corresponding to the base bid value associated with the base content placement campaign.

In some implementations, the bid modification module can be configured to automatically determine to implement a bid modification policy in response to monitoring the performance metrics of the content placement campaign. In some such implementations, the bid modification module can be configured to select an appropriate bid modification policy from a plurality of predetermined bid modification policies.

The bid modification module can be configured to identify one or more offerings to which to provide modified bid values. In some implementations, the offerings can be identified from the request. In some implementations, the offerings can be identified from monitoring performance metrics of the offerings in the content placement campaign. In some implementations, the offerings can be identified according to a bid modification policy that includes one or more conditions for which to provide modified bids.

In some implementations, the bid modification module 130 can identify one or more offerings specified by a request to modify the bids of offerings having predetermined attribute value associated with corresponding offering attributes. The bid modification module 130 can perform a search based on the attribute values and corresponding offering attributes specified in the request to identify the offerings.

In some implementations, once the offerings are identified, the bid modification module 130 can be determined to create one or more supplemental content placement campaigns for the identified offerings. In some implementations, the bid modification module 130 can determine to create a single content placement campaign for the identified offerings if the identified offerings can be hierarchically partitioned based on one or more offering attributes in such a way to include each of the offerings in a single partition group. In some implementations, the bid modification module 130 can determine to create a single content placement campaign for all offerings for which the modified bid value or bid modifier is the same. In some implementations, offerings to which to provide different bid values or bid modifiers can be included in different partition groups. In some implementations, the bid modification module 130 can be configured to create different content placement campaigns based on the number of different modified bids to be provided.

In some implementations, the bid modification module 130 can establish partition groups in each of the supplemental content placement campaigns that include one or more of the offerings. The bid modification module 130 can establish the partition groups such that the modified bid values or bid modifiers can be assigned to the partition group to which the offerings belong. As described above, offerings for which the modified bid value or bid modifier are different can be placed in the same content placement campaign under different partition groups or in separate content placement campaigns entirely.

The bid modification module 130 can be configured to assign the modified bid value or bid modifier to each of the partition groups of the supplemental content placement campaigns. The bid modification module 130 can assign the modified bid value or bid modifier to a partition group in such a manner that the offerings for which to provide the modified bid value are included in the appropriate partition group.

The bid modification module 130 can then assign a campaign priority level to the supplemental content placement campaigns that is higher than the campaign priority level of the primary or base content placement campaign. In some implementations, the bid modification module 130 can assign different priority levels to different supplemental content placement campaigns if a single offering for which to provide a modified bid can have more than two possible bids. This can be based on the bid modification policy associated with the offering.

For instance, an offering can have a corresponding base bid based on the partition group to which it is included in the primary content placement campaign. The offering can also have a first supplemental bid based on a time of day parameter associated with the auction and a second supplemental bid based on a geographic region associated with the auction. Specifically, the offering can have a first supplemental bid value for auctions between 8 am and 11 am and a second supplemental bid value for auctions occurring in the U.S. If an auction in which the offering is eligible to participate occurs at 10 am and in the U.S., the offering can place the first supplemental bid, the second supplemental bid or a combination of the first supplemental bid and the second supplemental bid. To avoid confusion as to which bid to place, the bid modification module 130 can assign a first priority level to the content placement campaign based on the time of day parameter and a second priority level different form the first priority level to the content placement campaign based on the geographic region parameter. If the first priority level is higher than the second priority level, the bid modification module 130 would have placed a bid corresponding to the first supplemental bid. Conversely, if the second priority level is higher than the first priority level, the bid modification module 130 would have placed a bid corresponding to the second supplemental bid.

In some implementations, the bid modification module 130 can determine a composite bid value based on one or more content placement campaigns. For instance, in the example above in which the auction in which the offering is eligible to participate occurs at 10 am and in the U.S., the bid modification module 130 could place a composite bid based on the first supplemental bid and the second supplemental bid.

In some implementations, the campaign priority level to assign to the content placement campaigns can be determined by the bid modification module 130. The bid modification module 130 can determine, based on the goals of the advertiser and the current performance metrics of the offering, which bid to place corresponding to the plurality of content placement campaigns.

In some implementations, when establishing secondary content placement campaigns that include offerings for which to not provide a modified bid, the bid values associated with partition groups in which such offerings are included can be delegated to the primary content placement campaign or the partition group can be excluded from the supplemental content placement campaigns. By delegating the bid value to another campaign, the bid value of the partition group of the primary content placement campaign can be used. In some implementations, by excluding the partition groups in the supplemental content placement campaign, the offerings no longer take part in auctions despite having bid values associated with partition groups in the primary content placement campaign since the campaign priority level of the supplement content placement campaign is higher than the campaign priority level of the primary content placement campaign.

The bid modification module 130 can be configured to provide a bid value to be bid in an auction. The bid modification module 130 can be configured to identify one or more offerings associated with the one or more primary and second content placement campaigns that are eligible to participate in the auction. In some implementations, the bid modification module 130 may identify all of the offerings that match the auction and then determine, based on one or more conditions, the offerings eligible to participate in the auction. In some implementations, the bid modification module 130 can then identify the content placement campaigns associated with each of the offerings eligible to participate in the auction. In some implementations, the bid modification module 130 can then select the content placement campaign having the highest priority level from the content placement campaigns associated with each of the offerings eligible to participate in the auction. In some implementations, the bid modification module 130 can then determine a bid value associated with the offering included in the selected content placement campaign to provide as a bid value. In some implementations, the selected content placement campaign includes a bid modifier instead of a bid value. In some implementations, the bid modification module 130 can identify the primary content placement campaign associated with the offering and identify, from the primary content placement campaign, a base bid value associated with the offering. The bid modification module 130 can then compute a modified bid value by modifying the base bid value using the bid modifier associated with the offering in the selected content placement c campaign. In some implementations, the modified bid value can be a product of the base bid value and the bid modifier associated with the offering in the selected content placement campaign In some implementations, the bid modification module 130 can be configured to provide a modified bid value by implementing one or more bid invocation policies that can be invoked by the bid modification module 130 to modify a bid value associated with a partition group to which an offering for which to provide a modified bid value belongs. In this way, instead of having to create separate content placement campaigns using a much larger product scope, the modifier module 130 can create one or more bid invocation policies. In some implementations, the bid invocation policies can be based on attribute values associated with one or more offering attributes. In some implementations, the bid modification module 130 can be configured to provide a modified bid to one or more offerings by taking advantage of one or more offering attributes associated with each of the offerings. For example, the bid modification module 130 can be configured to provide a modified bid for all offerings that have an attribute value "Nike" corresponding to the offering attribute "Brand." Similarly, the bid modification module 130 can be configured to provide a modified bid to a single offering by using an attribute value unique to the offering, for example, "Product 123" corresponding to an offering attribute "Product ID."

In some implementations, the bid modification module 130 can be configured to establish more than one bid invocation policies for a single offering. For example, an offering such as a Nike T-Shirt can be included as an offering of a partition group of a base content placement campaign. The partition group, for example, corresponds to All Products>Apparel>Brand and has an attribute value of "Nike." The partition group can be assigned a bid value of $1. The campaign owner can desire to promote T-shirts. As such, the bid modification module 130 can be configured to provide a bid modifier of 1.5 for all offerings that have an attribute value "T-shirts." As such, in some implementations in which the bid modifier is a bid multiplier, the bid modification module 130 can be configured to bid $1.5 based on the product of the bid value of the partition group and the bid multiplier. The campaign owner also desires to promote all Nike offerings. As such, the bid modification module 130 can be configured to provide a bid modifier of 2 for all offerings that have an attribute value "Nike." When an auction for a Nike T-shirt is occurring, in some implementations, the bid modification module 130 can bid $3 based on the product of the bid value of the partition group and the bid multiplier corresponding to the attribute value "T-shirts" and the bid multiplier corresponding to the attribute value "Nike." In some implementations, one or more additional bid management policies can be invoked by the bid modification module 130. For example, the bid modification module 130 can ensure that no bid value exceeds a predetermined value, for example, $2.50. In some such implementations, the bid modification module 130 may be configured to reduce the bid value from $3 to the maximum bid value based on the bid management policy. In some implementations, the bid modification module 130 can be configured to bid $2 or $1.5 or $1 based on the rules included in the bid management policy.

Figure 8:
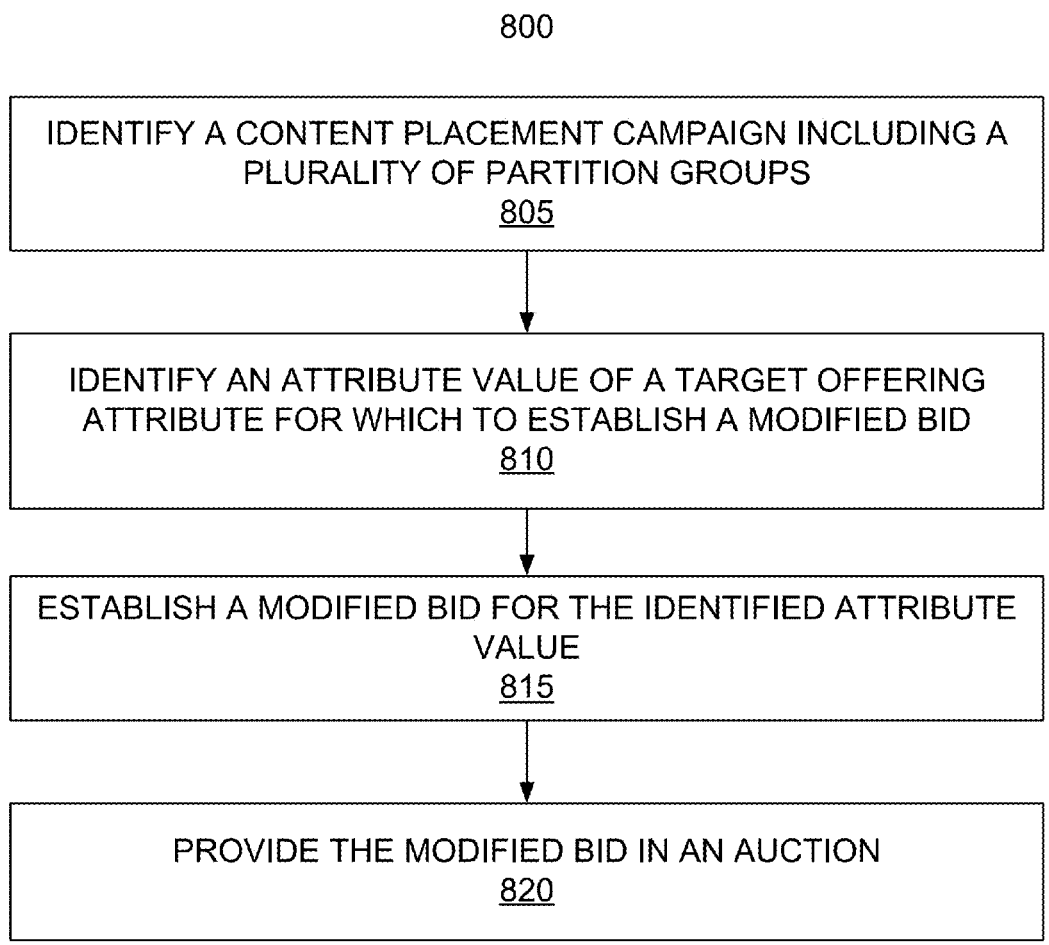
FIG. 8 is a flow diagram depicting one implementation of the steps taken to provide a modified bid in an auction.

FIG. 8 is a flow diagram depicting one implementation of the steps taken to provide a modified bid for an offering in an auction. In particular, FIG. 8 illustrates a flow diagram depicting a method 800 for providing a modified bid in an auction. In brief overview, the data processing system can identify a content placement campaign including a plurality of partition groups including one or more offerings characterized by one or more offering attributes (BLOCK 805). The data processing system can identify an attribute value of a candidate offering attribute for which to establish a modified bid (BLOCK 810). The data processing system can establish, for the identified attribute value of the candidate offering attribute, a modified bid corresponding to one or more offerings that match the identified attribute value of the candidate offering attribute (BLOCK 815). The data processing system can then provide the modified bid in an auction in which one of the offerings that match the identified attribute value of the candidate offering attribute is participating (BLOCK 820).

In further detail, the bid modification module can identify a content placement campaign including a plurality of partition groups including one or more offerings characterized by one or more offering attributes (BLOCK 805). In some implementations, the content placement campaign can be established by a partition hierarchy module 120. The content placement campaign can be established by hierarchically partitioning a data set including a plurality of offerings into a plurality of partition groups as described with respect to Section A. In this way, all the offerings or products included in a particular partition group can be treated alike. In some implementations, one or more of the partition groups can be assigned a bid value. In some implementations, the bid values can be provided by the advertiser. In some implementations, the bid values can be recommended by the bid recommendation module as described with respect to Section B.

The bid modification module can identify an attribute value of a candidate offering attribute for which to establish a modified bid (BLOCK 810). In some implementations, the bid modification module can identify an attribute value of a candidate offering attribute for which to establish a modified bid by monitoring the performance of the identified content placement campaign. In some implementations, the bid modification module can monitor the performance of the identified content placement campaign at a campaign level, a partition group level or an offering level.

In some implementations, the bid modification module can analyze performance metrics associated with a plurality of offerings included in the content placement campaign and identify one or more of the plurality of offerings having performance metrics statistics below a predetermined threshold and determine, from the performance metrics statistics, a modified bid to establish for the one or more offerings identified as having performance metrics statistics below or above the predetermined threshold.

In some implementations, the bid modification module can be configured to identify trends corresponding to the performance of the offerings or partition groups. In some implementations, the bid modification module can identify an attribute value of a candidate offering attribute for which to establish a modified bid by identifying a plurality of offerings for which to provide a modified bid and determining an attribute value of a candidate offering attribute common to the plurality of offerings. For example, the bid modification module can identify that a plurality of Nike products across different partition groups have below average performance metrics statistics. The bid modification module can then identify that an attribute value "Nike" of a candidate offering attribute "Brand" for which to establish an increased bid to improve the performance of the plurality of Nike products. In some implementations, the bid modification module can identify an attribute value of a candidate offering attribute for which to establish a modified bid by identifying a particular offering for which to provide a modified bid and determining an attribute value of a candidate offering attribute unique to the particular offering. For example, the bid modification module can determine that the impression share of the product "Google Nexus 7 tablet" is greater than the desired impression share. The bid modification module can determine an attribute value "Product ID 123" unique to the "Google Nexus 7 tablet" of the offering attribute "Product identifier."

In some implementations, the bid modification module can monitor auction related data of auctions in which the offerings participated. The bid modification module can identify, for one or more offering attributes, trends relating to the performance of the offerings. The bid modification module can then determine, from the identified trends, a potential opportunity to modify the performance of the offerings for which the trend was identified. In some implementations, the bid modification module can take an action to establish modified bids only if the trends are statistically significant.

In some implementations, the data processing system can identify a bid modification policy for applying the modified bid. The bid modification policies can be stored in a content repository. The bid modification policies can include one or more rules specifying parameters under which to modify a bid. The bid modification policies can also identify one or more modified bid values or bid modifiers and the manner in which they are to be applied. In some implementations, the bid modification policies can include instructions for creating supplemental content placement campaigns and assigning priority levels to each of the supplemental and base content placement campaigns. The data processing system can identify that one or more conditions of the bid modification policy have been met. For example, the bid modification policy can include a condition for increasing a bid value for any offerings that has an impression share of less than 20%. The data processing system can identify one or more offerings that satisfy this condition based on analyzing the performance metrics statistics of each of the offerings. The data processing system 110 can then determine a modified bid for the offering to improve the impression share of the offering. In some implementations, the bid recommendation module can determine a modified bid based one or more goals of the content placement campaign. In some implementations, the data processing system can select the modified bid from a plurality of modified bid values. In some implementations, the data processing system can select the modified bid to provide in an auction in which one of the offerings that match the identified attribute value of the candidate offering attribute is participating.

The bid modification module can establish, for the identified attribute value of the candidate offering attribute, a modified bid corresponding to one or more offerings that match the identified attribute value of the candidate offering attribute (BLOCK 815).

In some implementations, the bid modification module can receive a modified bid from an entity managing the content placement campaign. In some implementations, the modified bid corresponds to a bid modifier configured to modify a base bid value associated with a partition group of the content placement campaign. In some implementations, the modified bid can be determined by the bid recommendation module of the data processing system. In some implementations, the modified bid can be based on the performance metrics statistics of the offerings for which a modified bid is to be established.

In some implementations, to establish a modified bid, the data processing system can establish a secondary or supplemental content placement campaign in which offerings associated with the identified attribute value of the candidate offering attribute are included in a single partition group. In some implementations, the partition hierarchy module can be configured to establish supplemental content placement campaigns. The supplemental content placement campaigns can include a partition group based on the identified attribute value of the candidate offering attribute. The bid modification module can then assign the modified bid to the single partition group. In some implementations, the bid modification module can assign the secondary content placement campaign a priority level higher than a priority level of the content placement campaign. In some implementations, the modified bid can be a modified bid value. In some implementations, the modified bid can be a bid modifier that modifies a bid value corresponding to the offering of the base content placement campaigns. The bid modifier can be a bid multiplier. The modified bid can be computed by multiplying the bid multiplier and the base bid value. In some implementations, the bid modifier can be a bid amount that can be added or subtracted from the base bid value.

The data processing system can then provide the modified bid in an auction in which one of the offerings that match the identified attribute value of the candidate offering attribute is participating (BLOCK 820). In some implementations, the modified bid can be provided in response to a request from an advertising auction system. In some implementations, the data processing system can provide the modified bid according to a bid modification policy.

FIG. 9 shows the general architecture of an illustrative computer system 900 that may be employed to implement any of the computer systems discussed herein (including the system 100 and its components such as the partition hierarchy module 120, the bid recommendation module 125 and the bid modifier module 130) in accordance with some implementations. The computer system 900 can be used to provide information via the network 105 for display. The computer system 900 of FIG. 9 comprises one or more processors 920 communicatively coupled to memory 925, one or more communications interfaces 905, and one or more output devices 910 (e.g., one or more display units) and one or more input devices 915. The processors 920 can be included in the data processing system 110 or the other components of the system 100 such as the partition hierarchy module 120, the bid recommendation module 125 and the bid modifier module 130.

In the computer system 900 of FIG. 9, the memory 925 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 925 to store information related to one or more text-based content items, image-based content items, one or more images to be used to create image-based content items based on the text-based content items, and one or more statistics associated with the images, text-based content items and image-based content items. The memory 925 can include the database 140. The processor(s) 920 shown in FIG. 9 may be used to execute instructions stored in the memory 925 and, in so doing, also may read from or write to the memory various information processed and or generated pursuant to execution of the instructions.

The processor 920 of the computer system 900 shown in FIG. 9 also may be communicatively coupled to or control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 900. Examples of communications interfaces 905 include user interfaces (e.g., web pages), through which the user can communicate with the data processing system 110.

The output devices 910 of the computer system 900 shown in FIG. 9 may be provided, for example, to allow various information to be viewed or otherwise perceived in connection with execution of the instructions. The input device(s) 915 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The partition hierarchy module 120, the bid recommendation module 125 and the bid modifier module 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 900 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the partition hierarchy module 120, the bid recommendation module 125 and the bid modifier module 130 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any program in any vertical in which image-based content can be created from text-based content. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for hierarchically partitioning a data set including a plurality of offerings, comprising:
   receiving, by a data processing system, a data set including a plurality of offerings, each of the offerings characterized by one or more offering attributes;
   identifying one or more advertising performance metric goals for the data set;
   determining, by the data processing system, based on the identified advertising performance metric goals for the data set, a first offering attribute and a first plurality of attribute values of the first offering attribute according to which to partition the offerings across a first plurality of partition groups;
   determining, by the data processing system, based on the identified advertising performance metric goals for the data set, a second offering attribute and a second plurality of attribute values of the second offering attribute according to which to further partition offerings included in a first subset of the first plurality of partition groups;
   determining, by the data processing system, based on the identified advertising performance metric goals for the data set, a third plurality of attribute values of a third offering attribute according to which to further partition offerings included in a second subset of the first plurality of partition groups;
   partitioning the plurality of offerings across the first plurality of partition groups;
   partitioning the plurality of offerings included in the first subset of the first plurality of partition groups across the second plurality of partition groups; and
   partitioning the plurality of offerings included in the second subset of the first plurality of partition groups across the third plurality of partition groups.

2. The method of claim 1, wherein receiving a data set including a plurality of offerings includes receiving one or more of the first offering attribute, the second offering attribute and the third offering attribute.

3. The method of claim 1, wherein determining the first offering attribute and the first plurality of attribute values of the first offering attribute according to which to partition the offerings across a first plurality of partition groups includes:
   identifying, for the first offering attribute, each of the attribute values associated with the plurality of offerings of the data set;
   determining, for each of the identified attribute values of the first offering attribute, a number of offerings corresponding to the identified attribute value; and
   selecting one or more attribute values having a number of offerings that exceed a threshold number of offerings as attribute values according to which to partition the offerings across a first plurality of partition groups.

4. The method of claim 3, wherein at least one of the plurality of attribute values of the first offering attribute according to which to partition the offerings corresponds to a discrete attribute value associated with a particular attribute.

5. The method of claim 3, wherein at least one of the plurality of attribute values according to which to partition the offerings corresponds to a range of attribute values associated with a particular attribute.

6. The method of claim 1, wherein determining the first offering attribute and the first plurality of attribute values of the first offering attribute according to which to partition the offerings across a first plurality of partition groups includes:
   identifying bid history associated with the offerings;
   determining, from the bid history, one or more bid value ranges, the bid value ranges including one or more average bid values associated with the attribute values; and
   grouping attribute values corresponding to a bid value range of the bid value ranges.

7. A system for hierarchically partitioning a data set including a plurality of offerings, comprising:
   a data processing system having a partition hierarchy module, the data processing system further comprising
   a memory storing processor-executable instructions; and
   a processor configured to execute the processor-executable instructors to:
      receive a data set including a plurality of offerings, each of the offerings characterized by one or more offering attributes;
      identify one or more advertising performance metric goals for the data set;
      determine, based on the identified advertising performance metric goals for the data set, a first offering attribute and a first plurality of attribute values of the first offering attribute according to which to partition the offerings across a first plurality of partition groups;
      determine, based on the identified advertising performance metric goals for the data set, a second offering attribute and a second plurality of attribute values of the second offering attribute according to which to further partition offerings included in a first subset of the first plurality of partition groups;
      determine, based on the identified advertising performance metric goals for the data set, a third plurality of attribute values of a third offering attribute according to which to further partition offerings included in a second subset of the first plurality of partition groups;
      partition the plurality of offerings across the first plurality of partition groups;
      partition the plurality of offerings included in the first subset of the first plurality of partition groups across the second plurality of partition groups; and
      partition the plurality of offerings included in the second subset of the first plurality of partition groups across the third plurality of partition groups.

8. The system of claim 7, wherein to receive a data set including a plurality of offerings, the processor receives one or more of the first offering attribute, the second offering attribute and the third offering attribute.

9. The system of claim 7, wherein to determine the first offering attribute and the first plurality of attribute values of the first offering attribute according to which to partition the offerings across a first plurality of partition groups, the processor
   identifies, for the first offering attribute, each of the attribute values associated with the plurality of offerings of the data set;
   determines, for each of the identified attribute values of the first offering attribute, a number of offerings corresponding to the identified attribute value; and
   selects one or more attribute values having a number of offerings that exceed a threshold number of offerings as attribute values according to which to partition the offerings across a first plurality of partition groups.

10. The system of claim 9, wherein at least one of the plurality of attribute values of the first offering attribute according to which to partition the offerings corresponds to a discrete attribute value associated with a particular attribute.

11. The system of claim 9, wherein at least one of the plurality of attribute values according to which to partition the offerings corresponds to a range of attribute values associated with a particular attribute.

12. The system of claim 7, wherein to determine the first offering attribute and the first plurality of attribute values of the first offering attribute according to which to partition the offerings across a first plurality of partition groups the processor:
   identifies bid history associated with the offerings;
   determines, from the bid history, one or more bid value ranges, the bid value ranges including one or more average bid values associated with the attribute values; and
   groups attribute values corresponding to a bid value range of the bid value ranges.

13. A computer-readable storage medium having instructions to provide information via a computer network, the instructions comprising instructions to:
   receive a data set including a plurality of offerings, each of the offerings characterized by one or more offering attributes;
   identify one or more advertising performance metric goals for the data set;
   determine, based on the identified advertising performance metric goals for the data set, a first offering attribute and a first plurality of attribute values of the first offering attribute according to which to partition the offerings across a first plurality of partition groups;
   determine, based on the identified advertising performance metric goals for the data set, a second offering attribute and a second plurality of attribute values of the second offering attribute according to which to further partition offerings included in a first subset of the first plurality of partition groups;
   determine, based on the identified advertising performance metric goals for the data set, a third plurality of attribute values of a third offering attribute according to which to further partition offerings included in a second subset of the first plurality of partition groups;
   partition the plurality of offerings across the first plurality of partition groups;
   partition the plurality of offerings included in the first subset of the first plurality of partition groups across the second plurality of partition groups; and
   partition the plurality of offerings included in the second subset of the first plurality of partition groups across the third plurality of partition groups.

14. The computer-readable storage medium of claim 13, wherein receiving a data set including a plurality of offerings includes receiving one or more of the first offering attribute, the second offering attribute and the third offering attribute.

15. The computer-readable storage medium of claim 13, wherein determining the first offering attribute and the first plurality of attribute values of the first offering attribute according to which to partition the offerings across a first plurality of partition groups includes:

identifying, for the first offering attribute, each of the attribute values associated with the plurality of offerings of the data set;

determining, for each of the identified attribute values of the first offering attribute, a number of offerings corresponding to the identified attribute value; and selecting one or more attribute values having a number of offerings that exceed a threshold number of offerings as attribute values according to which to partition the offerings across a first plurality of partition groups.

* * * * *